US012694866B2

(12) United States Patent
Zhang et al.

(10) Patent No.: US 12,694,866 B2
(45) Date of Patent: Jul. 28, 2026

(54) SPEECH RECOGNITION METHOD AND APPARATUS, DEVICE, AND STORAGE MEDIUM

(71) Applicant: Tencent Technology (Shenzhen) Company Limited, Shenzhen (CN)

(72) Inventors: Xilin Zhang, Shenzhen (CN); Bo Liu, Shenzhen (CN); Haipeng Wang, Shenzhen (CN); Jianxiong Ma, Shenzhen (CN); Ping Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 602 days.

(21) Appl. No.: 17/962,021

(22) Filed: Oct. 7, 2022

(65) Prior Publication Data

US 2023/0032385 A1        Feb. 2, 2023

Related U.S. Application Data

(63) Continuation of application No. PCT/CN2021/118514, filed on Sep. 15, 2021.

(30) Foreign Application Priority Data

Oct. 12, 2020    (CN) .......................... 202011082644.1

(51) Int. Cl.
*G10L 15/06*        (2013.01)
*G10L 15/02*        (2006.01)

(52) U.S. Cl.
CPC ............ *G10L 15/063* (2013.01); *G10L 15/02* (2013.01)

(58) Field of Classification Search
CPC ....... G10L 15/063; G10L 15/02; G10L 15/16; G06F 17/16; G06F 18/253; G06N 3/0442;
(Continued)

(56) References Cited

U.S. PATENT DOCUMENTS 11,079,418 B2 *    8/2021    Bernsee ............... G01R 23/167
2016/0322055 A1 *  11/2016   Sainath ................ G06N 3/0464
(Continued)

FOREIGN PATENT DOCUMENTS

CN        108109619 A      6/2018
CN        108630199 A      10/2018
(Continued)

OTHER PUBLICATIONS

Bahdanau, Dzmitry, Jan Chorowski, Dmitriy Serdyuk, Philemon Brakel, and Yoshua Bengio. "End-to-end attention-based large vocabulary speech recognition." In 2016 IEEE international conference on acoustics, speech and signal processing (ICASSP), pp. 4945-4949. IEEE, 2016. (Year: 2016).*
(Continued)

*Primary Examiner* — Fariba Sirjani
(74) *Attorney, Agent, or Firm* — Sughrue Mion, PLLC

(57)        ABSTRACT

A speech recognition method includes acquiring speech data, inputting a speech feature matrix of the speech data to a speech recognition model, the speech feature matrix being used for representing time-domain and frequency-domain features of the speech data, performing attention encoding on the speech feature matrix through the speech recognition model to obtain an encoded matrix, the encoded matrix including multiple encoded vectors, and decoding the multiple encoded vectors in the encoded matrix according to positions of the multiple encoded vectors in the encoded matrix to output a character string corresponding to the speech data, a decoding sequence of the multiple encoded
(Continued)

vectors being related to the positions of the multiple encoded vectors in the encoded matrix.

20 Claims, 9 Drawing Sheets

(58) Field of Classification Search
CPC .... G06N 3/0455; G06N 3/0464; G06N 3/082; G06N 3/084
See application file for complete search history.

(56) References Cited

U.S. PATENT DOCUMENTS

| | | | | |
|---|---|---|---|---|
| 2017/0148431 | A1* | 5/2017 | Catanzaro | G10L 15/16 |
| 2018/0238943 | A1* | 8/2018 | Bernsee | G06F 17/141 |
| 2018/0330718 | A1 | 11/2018 | Hori et al. | |
| 2018/0350351 | A1* | 12/2018 | Kopys | G10L 15/16 |
| 2020/0051551 | A1* | 2/2020 | Sainath | G06N 3/0464 |
| 2020/0227064 | A1* | 7/2020 | Xu | G06N 3/08 |
| 2021/0272571 | A1* | 9/2021 | Balasubramaniam | G10L 15/02 |
| 2021/0375291 | A1* | 12/2021 | Zeng | H04L 67/306 |
| 2022/0086147 | A1* | 3/2022 | Chen | H04L 63/0876 |

FOREIGN PATENT DOCUMENTS

| | | |
|---|---|---|
| CN | 110444203 A | 11/2019 |
| CN | 110473529 A | 11/2019 |
| CN | 111145728 A | 5/2020 |
| CN | 111524503 A | 8/2020 |
| CN | 111933115 A | 11/2020 |
| WO | 2020/101743 A1 | 5/2020 |

OTHER PUBLICATIONS

Vaswani, Ashish, Noam Shazeer, Niki Parmar, Jakob Uszkoreit, Llion Jones, Aidan N. Gomez, Åukasz Kaiser, and Illia Polosukhin. "Attention is all you need." Advances in neural information processing systems 30 (2017). (Year: 2017).*

Bie, Alex, Bharat Venkitesh, Joao Monteiro, Md Akmal Haidar, and Mehdi Rezagholizadeh. "A simplified fully quantized transformer for end-to-end speech recognition." arXiv preprint arXiv:1911.03604 (2019). (Year: 2019).*

Prabhavalkar, Rohit, Takaaki Hori, Tara N. Sainath, Ralf Schlüter, and Shinji Watanabe. "End-to-end speech recognition: A survey." IEEE/ACM Transactions on Audio, Speech, and Language Processing 32 (2023): 325-351. (Year: 2023).*

Chan, William, Navdeep Jaitly, Quoc V. Le, and Oriol Vinyals. "Listen, attend and spell." arXiv preprint arXiv:1508.01211 (2015). (Year: 2015).*

International Search Report of PCT/CN2021/118514 dated Dec. 14, 2021 [PCT/ISA/210].

Written Opinion of PCT/CN2021/118514 dated Dec. 14, 2021 [PCT/ISA/237].

Chinese Office Action of No. 202011082644.1 dated Nov. 24, 2020.

* cited by examiner

SPEECH RECOGNITION METHOD AND APPARATUS, DEVICE, AND STORAGE MEDIUM

CROSS-REFERENCE TO RELATED APPLICATIONS

This application is a continuation application of International Application No. PCT/CN2021/118514, filed on Sep. 15, 2021, which claims priority to Chinese Patent Application No. 202011082644.1, filed with the China National Intellectual Property Administration on Oct. 12, 2020, the disclosures of each of which are incorporated by reference in their entireties.

FIELD

The present disclosure relates to the field of speech recognition, and particularly to a speech recognition method and apparatus, a device, and a storage medium.

BACKGROUND

With the development of computer technology, people want easier manners to communicate. Directly sending speech information is an easier manner to communicate than text typing. However, in some cases, there is no condition for a user receiving speech information to listen to the speech information. For example, the user is in a noisy or very quiet environment. In such case, the user often converts the speech information into text information, so as to get what the other wants to convey.

SUMMARY

According to various embodiments, a speech recognition method, performed by a computer device, may include: acquiring speech data; inputting a speech feature matrix of the speech data to a speech recognition model, the speech feature matrix being used for representing time-domain and frequency-domain features of the speech data; performing attention encoding on the speech feature matrix through the speech recognition model to obtain an encoded matrix; and decoding the multiple encoded vectors in the encoded matrix according to positions of the multiple encoded vectors in the encoded matrix to output a character string corresponding to the speech data, a decoding sequence of the multiple encoded vectors being related to the positions of the multiple encoded vectors in the encoded matrix.

According to various embodiments, a speech recognition apparatus, a computer device, a non-transitory computer-readable storage medium, and a computer program product or a computer program consistent with the speech recognition method may also be provided.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
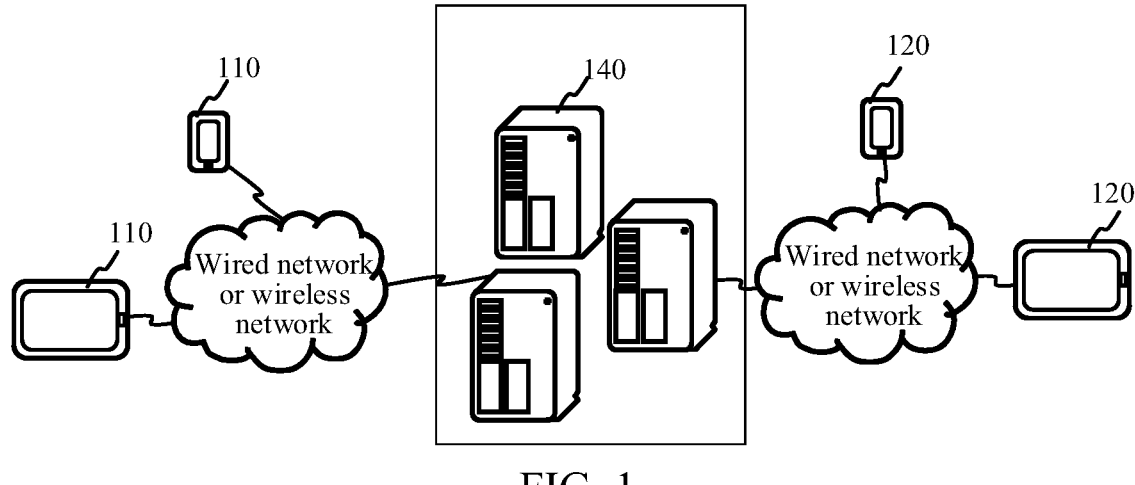
FIG. 1 is a schematic diagram of an implementation environment of a speech recognition method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

The terms "first", "second", and the like are used for distinguishing between same items or similar items of which effects and functions are basically the same. It should be understood that the "first", "second", and "nth" do not have a dependency relationship in logic or time sequence, and a quantity and an execution order thereof are not limited.

In the disclosure, "at least one" means one or more, and "a plurality of" means two or more. For example, a plurality of reference face images mean two or more reference face images.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid by use.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result.

Graphics processing unit (GPU): also referred to as a display core, a vision processor, or a display chip, it is a microprocessor that performs image and graphics related operations on personal computers, workstations, game machines, and some mobile devices (such as tablet computers and smartphones).

Speech recognition: it is a technology of converting speech signals into corresponding texts or commands by machines through recognition and understanding processes, which may be divided into a hybrid speech recognition system and an end-to-end speech recognition system according to an implementation algorithm.

Hybrid speech recognition: as a conventional speech recognition system, it implements sequential mapping of speech features, phonemes, words, and word strings, and is formed by multiple modules, such as an acoustic model, a pronunciation dictionary, and a language model.

End-to-end speech recognition system: the system no longer includes an independent acoustic model, pronunciation dictionary, language model, or other modules, and instead, an input end (speech feature sequence) is directly connected to an output end (word string sequence) by use of a neural network that takes on functions of all the original modules.

Speech feature: it is a feature extracted from input speech data by some data processing technologies and represented in form of a feature vector for the acoustic model to process, so as to maximally reduce the impact of environmental noises, channels, the speaker, and other factors on recognition.

Acoustic model: it is a calculation model for probabilities of mappings from speech features to phonemes. A phoneme is a minimum phonetic unit divided according to a natural attribute of a speech.

Pronunciation dictionary: the pronunciation dictionary includes collective vocabulary that the system may process and pronunciations thereof, and provides a mapping between a modeling unit of the acoustic model and a modeling unit of the language model.

Language model: it is a calculation model for probabilities of mappings from words to word strings, which may estimate a probability of a text to represent its probability of existence.

Convolutional neural network (CNN): it is a feedforward neural network whose neuron may respond to a unit within a receptive field. The CNN usually includes multiple convolutional layers and a full connection layer at the top, and is applied extensively to image and speech recognition by reducing the number of parameters of the model by parameter sharing.

Long short-term memory (LSTM): it is a recurrent neural network whose algorithm is added with a cell for determining whether information is useful. There is an input gate, a forget gate, and an output gate in a cell. After information enters the LSTM, whether the information is useful is determined according to a rule. Only information that is authenticated successfully by the algorithm is retained, and information that fails to be authenticated by the algorithm is forgotten through the forget gate. This network is suitable for processing and predicting important events with relatively long intervals and delays in time sequences.

Attention mechanism: in a hidden layer of a neural network, the attention mechanism adjusts a direction of attention and a weighting model according to a specific task goal. Additional weighting based on the attention mechanism makes contents unsatisfying the attention model weakened or forgotten. If the direction of attention is based on the neural network, the attention mechanism is referred to as a self-attention mechanism.

Multi-head attention (MHA) mechanism: it refers to dividing an input into a multiple heads to form multiple subspaces and completing the attention mechanism in each subspace for recombination. Multi-head attention mechanism may enable a model to learn related information in different representation subspaces.

Attention weight: it may represent importance of a certain piece of data during training or prediction, the importance representing the impact of the input data on output data. An attention weight corresponding to data of high importance has a relatively large value, and an attention weight corresponding to data of low importance has a relatively small value. Data is of different importance in different scenarios, and an attention weight training process of a model is a process of determining importance of data.

Transformer: as a self-attention mechanism-based neural network, it is applied extensively to the fields of speech recognition, image recognition, natural language processing, etc. An input sequence is additionally weighted based on the attention mechanism once or for many times to form a new output sequence, so as to make contents unsatisfying the attention model weakened or forgotten.

Attention-based encoder-decoder (AED): it is a model for solving sequence-to-sequence mapping problems. Unequal-length mapping of an encoded sequence and a decoded sequence is controlled by multi-head attention (MHA) vectors to complete construction of the end-to-end speech recognition system.

LSTM-AED: also referred to as listen, attend and spell (LAS), it is an AED model whose encoder is constructed based on an LSTM and decoder is simultaneously constructed based on an LSTM.

Transformer-AED: it is an AED model whose encoder is constructed based on a transformer and decoder is simultaneously constructed based on a transformer.

TL-AED: it is an AED model implemented by combining a transformer and an LSTM, whose encoder is constructed based on the transformer and decoder is simultaneously constructed based on the LSTM.

Normalization processing: it maps arrays of different value ranges to interval (0, 1) to facilitate data processing. In some cases, normalized numerical values may be directly implemented as probabilities.

Dropout: it is a method for optimizing an artificial neural network of a deep structure. In a learning process, part of weights or outputs of a hidden layer are randomly set to 0 to reduce dependencies between nodes, so as to implement normalization of the neural network and reduce the structural risk thereof. For example, there is a vector (1, 2, 3, 4) in a model training process, and after the vector is input to a dropout layer, the dropout layer may randomly set a digit in the vector (1, 2, 3, 4) to 0, for example, setting 2 to 0, to obtain a new vector (1, 0, 3, 4).

Learning rate: it is used for controlling a learning progress of a model. The learning rate may guide the model to adjust a network weight by use of a gradient of a loss function in gradient descent. If the learning rate is too large, the loss function may directly miss a global optimum, and at this point, the loss is too large. If the learning rate is too small, the loss function may change slowly, which may greatly increase the convergence complexity of the network and is prone to trapping at a local minimum or a saddle point.

Embedded coding: embedded coding represents a mathematical mapping. That is, data in an X space is mapped to a Y space by a function F. The function F is an injective function, and a mapping result is structure-preserving. The injective function represents that data after mapping is in unique mapping to data before mapping. Structure preserving represents that a magnitude relationship of the data before mapping is the same as that of the data after mapping. For example, there is $X_1$ and $X_2$ before mapping, and $Y_1$ corresponding $X_1$ and $Y_2$ corresponding to $X_2$ are obtained after mapping. If data $X_1$ is greater than $X_2$ before mapping, data $Y_1$ is correspondingly greater than $Y_2$ after mapping. For words, the words are mapped to another space for subsequent machine learning and processing.

In the related art, the hybrid speech recognition system is used for speech recognition. The hybrid speech recognition system obtains text information corresponding to speech information by sequential mapping of speech features, phonemes, words, and word strings.

However, the hybrid speech recognition system includes multiple modules that are unlikely to coordinate well, such as an acoustic model, a pronunciation dictionary, and a language model. As a result, the speech recognition accuracy is relatively low.

FIG. 1 is a schematic diagram of an implementation environment of a speech recognition method according to some embodiments. Referring to FIG. 1, the implementation environment may include a first terminal 110, a second terminal 120, and a server 140.

In some embodiments, the first terminal 110 is a smartphone, a tablet computer, a notebook computer, a desktop computer, a smart speaker, a smartwatch, or the like, but is not limited thereto. An application program supporting instant messaging is installed and run on the first terminal 110.

In some embodiments, the second terminal 120 is a smartphone, a tablet computer, a notebook computer, a desktop computer, a smart speaker, a smartwatch, or the like, but is not limited thereto. An application program supporting instant messaging is installed and run on the second terminal 120.

In some embodiments, the server 140 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

In some embodiments, the first terminal 110 is connected to the server 140 by using a wireless network or a wired network. The first terminal 110 may transmit a collected speech message to the server 140, the server 140 transmits the speech message to the second terminal 120, and a user of the second terminal 120 may listen to the speech message through the second terminal 120. If it is inconvenient for the user of the second terminal 120 to listen to the speech message, the user of the second terminal 120 may transmit the speech message to the server 140 through the second terminal 120, the server 140 performs speech recognition on the speech message, and transmits a speech recognition result to the second terminal 120, and the second terminal 120 displays the speech recognition result to the user. In this process, the server 140 provides background service for speech recognition.

After the introduction of the implementation environment of the technical solution provided in some embodiments, application scenarios next be introduced.

The technical solution provided in some embodiments may be performed by a server. That is, the speech recognition solution is put on cloud service for a user of the cloud service to use as a basic technology. For example, the technical solution provided in some embodiments may be applied to instant messaging, video subtitling, writing, searching of a smart home device, real-time speech to text at a meeting, automatic text recording at a court trial, conversion of a content taught by a teacher to a text by a student, communication with a patient with hearing impairment, an online game, real-time translation, and other scenarios.

Taking instant messaging as an example, when it is inconvenient for a user to listen to speeches, a speech transmitted by another user is directly converted into a text, so as to rapidly get what the other wants to express.

A speech to text process includes the following operations.

Figure 2:
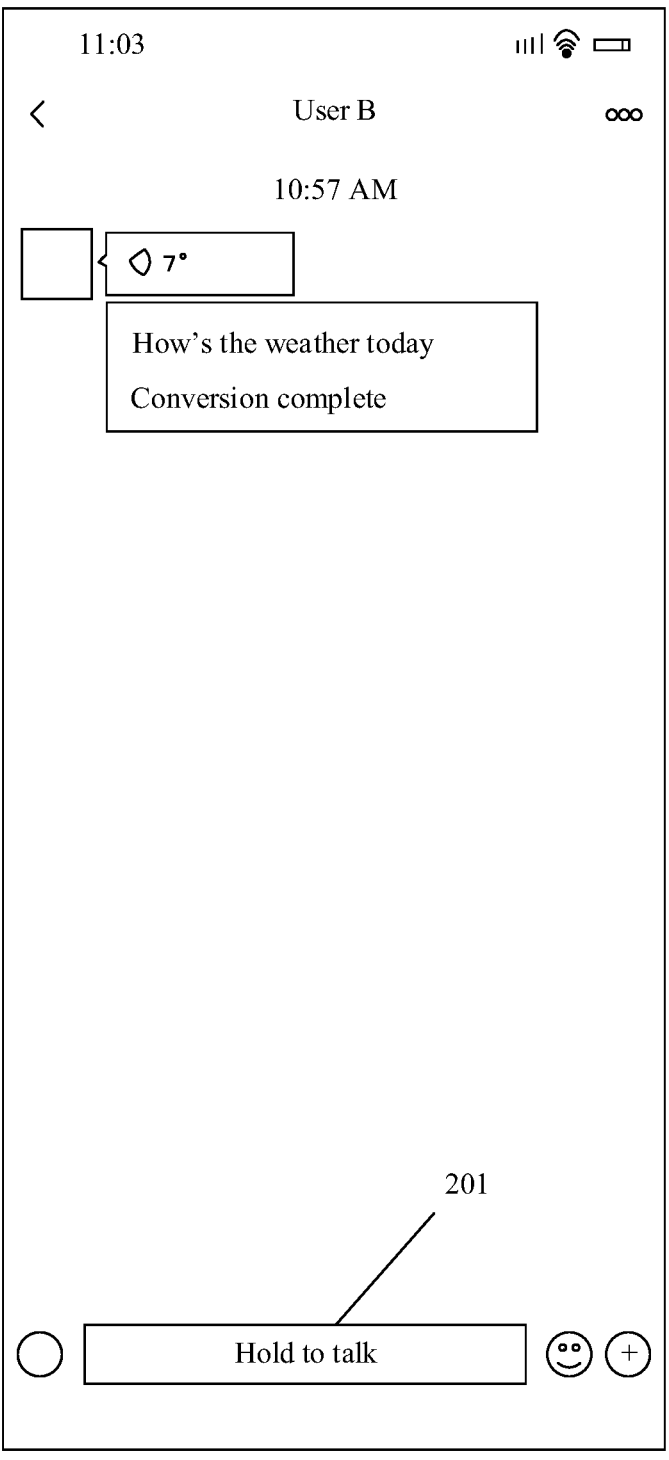
FIG. 2 is a schematic diagram of an interface according to some embodiments.

In 11, referring to FIG. 2, user A presses "hold to talk" of a control 201, and client A records a speech of user A. User A releases "hold to talk" of the control 201 at the end of the speech, to end recording.

In 12, client A compresses the collected speech, and packs, by use of a network protocol, and sends the compressed speech to a server.

In 13, the server acquires the speech sent by client A, and transmits the speech to client B of user B.

Figure 3:
FIG. 3 is a schematic diagram of an interface according to some embodiments.

In 14, referring to FIG. 3, client B receives the speech transmitted by the server. If it is inconvenient for user B to listen to the speech, user B long presses an icon corresponding to this speech, and selects speech to text 301 from an option box that pops up. Client B sends the speech sent by user A to the server in a case that user B selects speech to text 301.

In 15, the server receives the speech that user B wants to convert, and decompresses and sends the speech to a speech recognition model. After the speech recognition model converts the speech into a text, the server transmits the text to client B.

In 16, client B receives and displays the text on an interface, such that user B may get what user A wants to express without listening to the speech.

Taking writing as an example, when writing, a user needs not to enter a text through a keyboard but only to speak through an audio collector, such as a microphone, and a terminal may directly convert a speech of the user into a text for displaying. Therefore, the writing efficiency of the user is improved.

A process of writing by speech recognition includes the following operations.

In 21, the user switches an input method to a speech input method, and taps a recording control provided by the speech input method. The speech input method records a speech of the user. The user taps the recording control again at the end of the speech, to end recording.

In 22, the terminal compresses the collected speech, and packs, by use of a network protocol, and sends the compressed speech to a server.

In 23, the server acquires the speech sent by the speech input method, and decompresses and sends the speech to a speech recognition model. After the speech recognition model converts the speech into a text, the server transmits the text to the terminal.

In 24, the terminal displays the text on an interface for writing of the user, such that the user may complete the writing process by speaking without entering the text through a keyboard.

Taking searching of a smart home device as an example, if the smart home device is a smart television, a user may control the smart television through a speech to play what the user wants.

A process of searching for a content by speech recognition includes the following operations.

In 31, the user holds down a "talk" control on a remote controller of the smart television. A speech of the user is sent to the smart television by the remote controller of the smart television as a microphone through a wireless connection. The smart television records the speech of the user. The user releases the "talk" control at the end of the speech, to end recording.

In 32, the smart television compresses the collected speech, and packs, by use of a network protocol, and sends the compressed speech to a server.

In 33, the server acquires the speech sent by the smart television, and decompresses and sends the speech to a speech recognition model. After the speech recognition model converts the speech into a text, the server transmits the text to the smart television.

In 34, the smart television performs searching based on the acquired text, and displays, on an interface, a search result obtained based on the speech of the user.

Taking real-time speech to text at a meeting as an example, a recorder at the meeting may convert what the speaker expresses in the meeting into a text in real time by the speech recognition method provided in some embodiments, so as to summarize the content of the meeting conveniently to form more comprehensive meeting minutes.

A process of real-time speech to text at the meeting by speech recognition includes the following operations.

In 41, a user records a speech of a speaker at the meeting through a terminal.

In 42, the terminal compresses the collected speech, and packs, by use of a network protocol, and sends the compressed speech to a server.

In 43, the server acquires the speech sent by the terminal, and decompresses and sends the speech to a speech recognition model. After the speech recognition model converts the speech into a text, the server transmits the text to the terminal.

In 44, the terminal displays the acquired text on a screen, the text being a text corresponding to the speech of the speaker at the meeting.

Taking automatic text recording at a court trial as an example, during the trial, the court clerk needs to record what the plaintiff, the defendant, and the judicial personnel express. Generally speaking, the court clerk taps a keyboard for recording. With the adoption of the speech recognition method provided in some embodiments, the court clerk may convert what the plaintiff, the defendant, and the judicial personnel express into a text in real time with a terminal, and needs not to keep tapping the keyboard for recording but only to supplement details and correct errors. Therefore, the workload of the court clerk is reduced greatly.

A process of automatic text recording at the court trial by speech recognition includes the following operations.

In 51, the court clerk records speeches of the plaintiff, the defendant, and the judicial personnel during the trial through the terminal.

In 52, the terminal compresses the collected speeches, and packs, by use of a network protocol, and sends the compressed speeches to a server.

In 53, the server acquires the speeches sent by the terminal, and decompresses and sends the speeches to a speech recognition model. After the speech recognition model converts the speeches into a text, the server transmits the text to the terminal.

In 54, the terminal displays the acquired text on a screen, the text being a text automatically recorded at the court trial.

Taking communication with a patient with hearing impairment as an example, in a communication process of the patient with hearing impairment, a user may convert what he/she wants to express into a text by the speech recognition method provided in some embodiments for the patient with hearing impairment to view, so as to communicate with the patient with hearing impairment.

A process of communication with the patient with hearing impairment by speech recognition includes the following operations.

In 61, the user may record what he/she wants to express through a terminal.

In 62, the terminal compresses a collected speech, and packs, by use of a network protocol, and sends the compressed speech to a server.

In 63, the server acquires the speech sent by the terminal, and decompresses and sends the speech to a speech recognition model. After the speech recognition model converts the speech into a text, the server transmits the text to the terminal.

In 64, the terminal displays the acquired text on a screen, the text being a text corresponding to what the user wants to express to communicate with the patient with hearing impairment, such that the patient with hearing impairment may get what the user wants to express through the text.

Taking an online game as an example, a player who wants to communicate with another player in the game may implement communication by speech to text, in addition to a real-time speech or typing.

A process of communication with the other player by speech recognition includes the following operations.

In 71, the player presses down a "speech to text" control displayed on a game interface, and starts speaking. A game client collects a speech of the player through a microphone, and ends recording after target time.

In 72, the game client compresses the collected speech, and packs, by use of a network protocol, and sends the compressed speech to a server.

In 73, the server acquires the speech sent by the game client, and decompresses and sends the speech to a speech recognition model. After the speech recognition model converts the speech into a text, the server transmits the text to the game client.

In 74, the game client displays the client in a text entry box for communication between the player and the other player. When confirming that the text is consistent with what he/she wants to express, the player taps a sending control to send the text to the server, and the server transfers the text to the other player.

Taking real-time translation as an example, when user C speaking language A needs to communicate with user D speaking language B, speeches of the two users are recorded by terminals. For example, when user C speaks, the terminal may convert what user C expresses in language A into a text corresponding to language A, and then translate the text corresponding to language A into a text corresponding to language B. When user D speaks, the terminal may convert what user D expresses in language B into a text corresponding to language B, and then translate the text corresponding to language B into a text corresponding to language A.

A process when user C speaks will now be described as an example, including the following operations.

In 81, the terminal records a speech of user C.

In 82, the terminal compresses the collected speech, and packs, by use of a network protocol, and sends the compressed speech to a server.

In 83, the server acquires the speech sent by the terminal, and decompresses and sends the speech to a speech recognition model. The speech recognition model outputs a text corresponding to the speech. The server translates the text into a text corresponding to language B, and transmits the text corresponding to language B to the terminal.

In 84, the terminal displays the acquired text on a screen, such that user D may get what user C wants to express through the text.

It is be noted that each of the above-mentioned scenarios is only the exemplary description of the application scenario of the technical solution provided in some embodiments. In another possible implementation mode, the technical solution provided in some embodiments may be applied to other speech recognition scenarios. No limits are made thereto in some embodiments.

Figure 4:
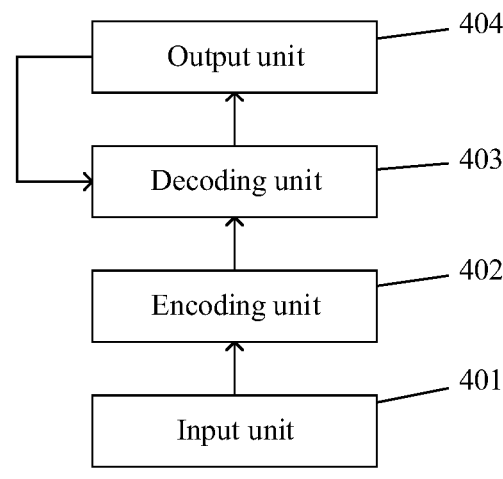
FIG. 4 is a schematic structural diagram of a speech recognition model according to some embodiments.

In some embodiments, a speech recognition model is needed to implement the speech recognition method. The structure of the speech recognition model provided in some embodiments will now be introduced. Referring to FIG. 4, the speech recognition model includes an input unit 401, an encoding unit 402, a decoding unit 403, and an output unit 404.

The input unit 401 is configured to input a speech feature matrix of speech data to the model. The encoding unit 402 is configured to encoding the speech feature matrix to obtain an encoded matrix. The decoding unit 403 is configured to decode the encoded matrix to obtain a character string corresponding to the speech data. The output unit 404 is configured to output the character string.

Figure 5:
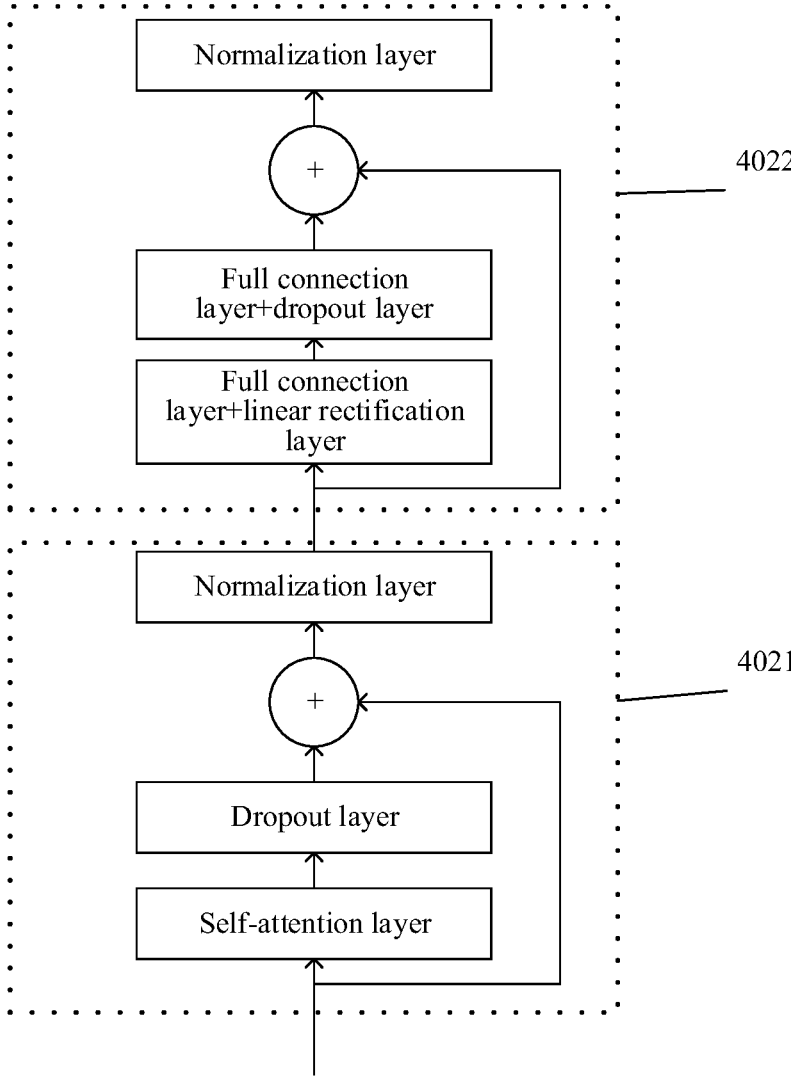
FIG. 5 is a schematic structural diagram of a speech recognition model according to some embodiments.

In some embodiments, referring to FIG. 5, the encoding unit 402 includes a self-attention subunit 4021 and a full connection subunit 4022. The self-attention subunit 4021 is configured to perform attention encoding on the speech feature matrix. The full connection subunit 4022 is configured to perform full connection on the speech feature matrix subjected to attention encoding to output the encoded matrix.

In some embodiments, the self-attention subunit 4021 includes a self-attention layer, a dropout layer, a residual accumulation (⊕) layer, and a normalization layer (Layer Norm). The self-attention layer is configured to perform self-attention encoding on the speech feature matrix. The dropout layer is configured to randomly set a parameter in the speech feature matrix subjected to self-attention encoding to 0, to prevent over-fitting during training of the speech recognition model. The residual accumulation layer is configured to perform residual accumulation on the speech feature matrix to avoid information loss and improve the training effect. The normalization layer is configured to normalize the speech feature matrix subjected to residual accumulation to alleviate gradient explosion or gradient vanishing during model training.

The full connection subunit 4022 includes a first full connection layer and a second full connection layer. The first full connection layer includes a full connection layer (FC1) and a linear rectification layer (Relu). The second full connection layer includes a full connection layer (FC2) and a dropout layer (Dropout).

Figure 6:
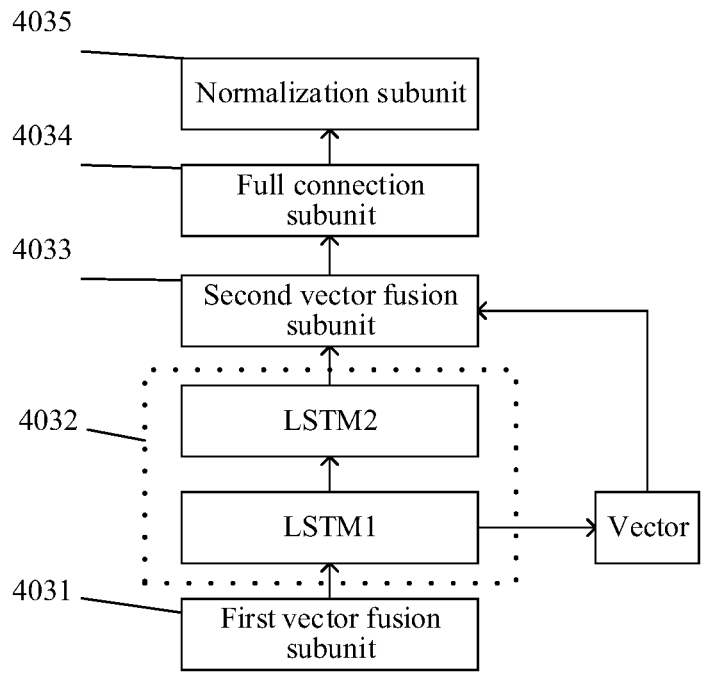
FIG. 6 is a schematic structural diagram of a speech recognition model according to some embodiments.

In some embodiments, referring to FIG. 6, the decoding unit 403 includes a first vector fusion subunit 4031, a sequential decoding subunit 4032, a second vector fusion subunit 4033, a full connection subunit 4034, and a normalization subunit 4035. The first vector fusion subunit 4031 is configured to fuse a first encoded vector in the encoded matrix and an embedded vector of a character obtained in a last decoding process to output a first fused vector. The sequential decoding subunit 4032 is configured to perform sequential decoding on the first fused vector to output a first implicit feature vector of the first encoded vector. The second vector fusion subunit 4033 is configured to fuse the first implicit feature vector and the first fused vector to obtain a second fused vector. The full connection subunit 4034 is configured to perform full connection on the second fused vector. The normalization subunit 4035 is configured to normalize the second fused vector subjected to full connection to obtain a character corresponding to the first encoded vector.

In some embodiments, there are two sequential decoding subunits 4032 (LSTM1 and LSTM2). Therefore, the model depth of the speech recognition model may be increased, and the speech recognition effect may be improved.

The structure of the sequential decoding subunit 4032 will now be described.

Figure 7:
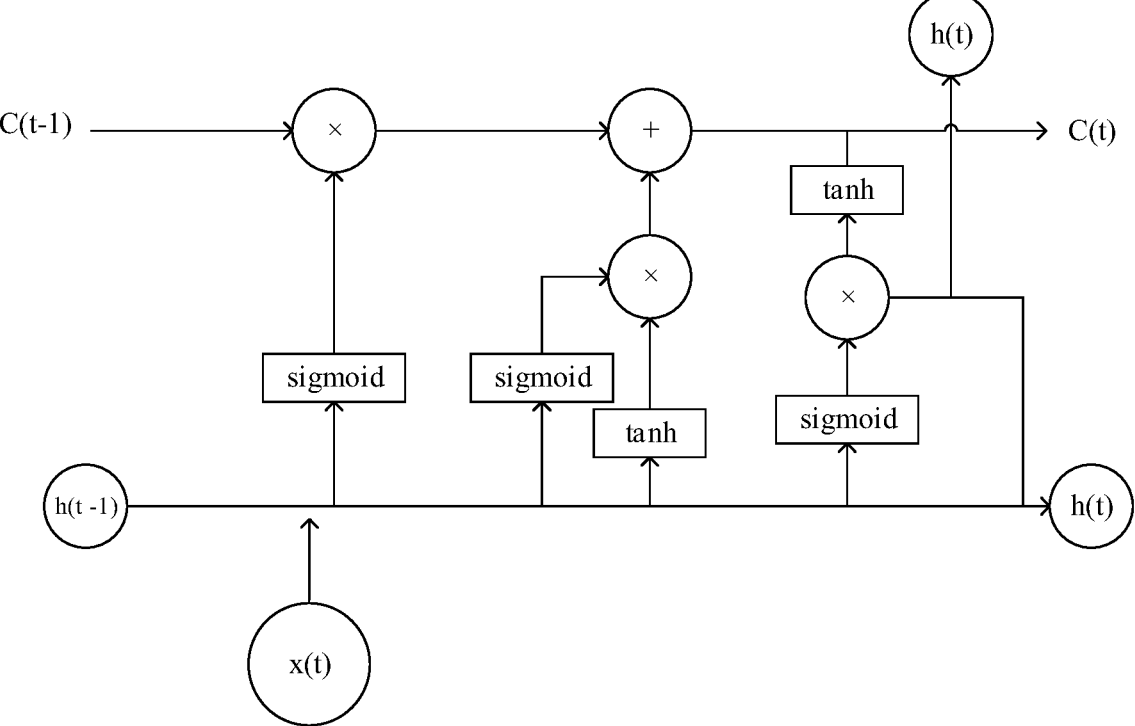
FIG. 7 is a schematic structural diagram of an encoding unit according to some embodiments.

Referring to FIG. 7, the sequential decoding subunit 4032 includes a "forget gate", an "input gate", and an "output gate". In FIG. 7, x(t) represents the first fused vector, h(t−1) represents an implicit feature vector obtained in the last decoding process, C(t−1) represents a state parameter after the last decoding process, C(t) represents a state parameter in a current decoding process, h(t) represents an implicit feature corresponding to the first encoded vector, "×" represents multiply, "+" represents add, "sigmoid" represents a softmax activation function, and "tanh" represents a tangent activation function.

In some embodiments, the encoding unit 402 is a transformer-based encoding unit, the decoding unit 403 is an LSTM-based decoding unit, and the speech recognition model may also be referred to as a TL-AED model.

Figure 8:
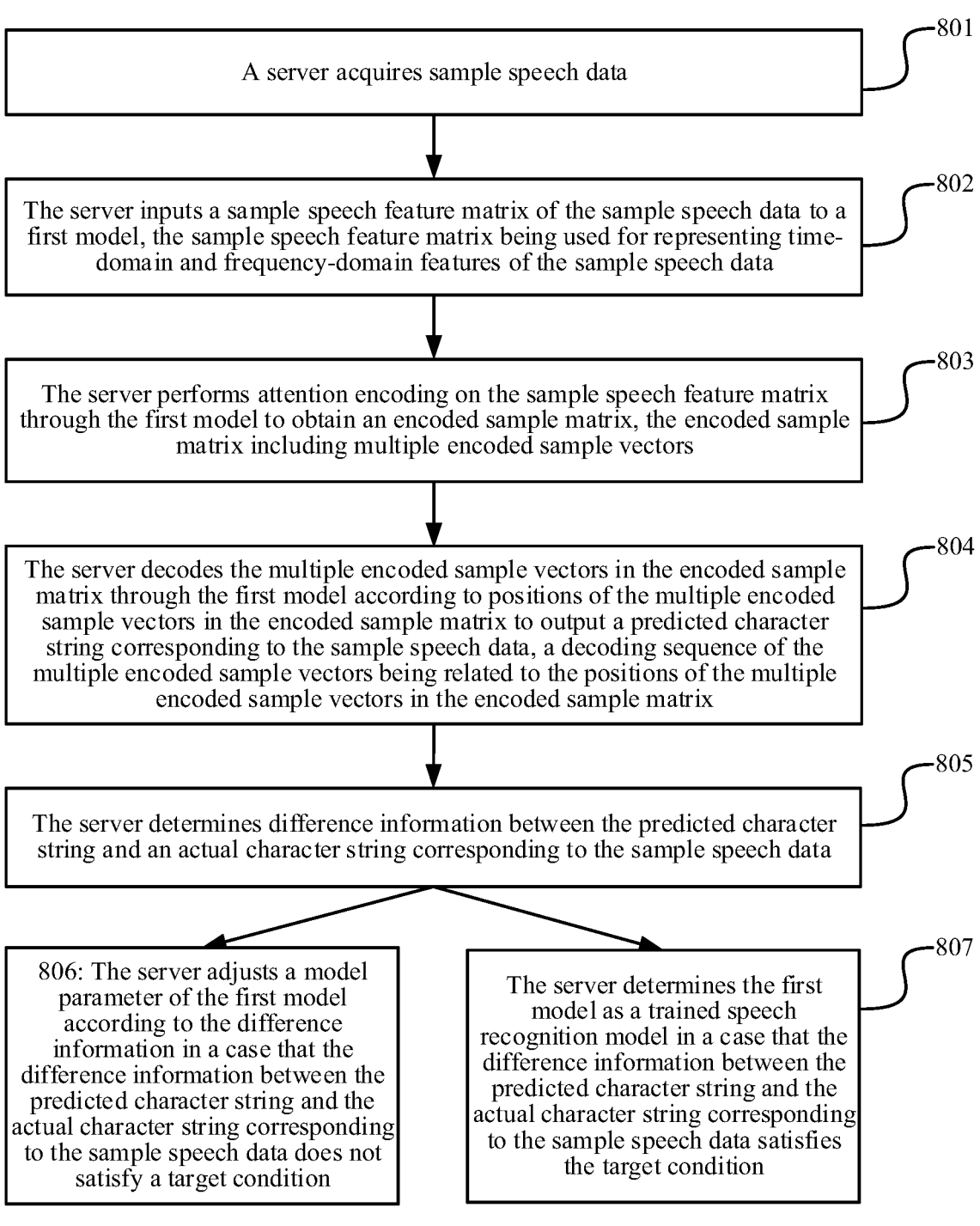
FIG. 8 is a flowchart of a speech recognition model training method according to some embodiments.

After the introduction of the structure of the speech recognition model provided in some embodiments, a training method for the speech recognition model will now be described. Referring to FIG. 8, the method includes the following operations.

In 801, a server acquires sample speech data.

The sample speech data is a labeled speech sequence. The speech sequence is a two-dimensional vector: the first dimension is time, and the second dimension is amplitude corresponding to time. Being labeled refers to that the speech sequence corresponds to a text sequence whose content is a content the speech sequence represents.

In some embodiments, a technician inputs and labels speech data through a terminal, and transmits the labeled speech data to the server as sample speech data, and the server performs subsequent model training based on the sample speech data.

For example, the technician inputs speech "how are you" through the terminal. The terminal converts "how are you" input by the technician into a speech sequence $$\begin{bmatrix} 15 & 30 & 45 & 60 & 75 & 90 \\ 0.10 & 0.15 & 0.14 & 0.13 & 0.2 & 0.10 \end{bmatrix},$$

where the digit in the first row represents time measured in milliseconds, and the digit in the second row represents amplitude measured in millimeters. The technician labels a text sequence "how are you" corresponding to the speech sequence through the terminal. The speech sequence and the labeled text sequence form sample speech data.

In some embodiments, the server acquires a labeled sample speech data set from a network, the sample speech data set including multiple pieces of sample speech data. The server may train the speech recognition model based on the sample speech data set.

Based on the above-mentioned implementation mode, the technician may also select different types of sample speech data sets according to the application scenario of the speech recognition method provided in some embodiments. For example, if the speech recognition method is applied to an online game, the technician may select a sample speech data set generated based on game vocabulary during training of the speech recognition model, so as to improve the accuracy of speech recognition accuracy in the online game. If the speech recognition method is applied to searching of a smart home device, the technician may correspondingly select a sample speech data set generated based on search instructions related to the smart home device during training of the speech recognition model.

In 802, the server inputs a sample speech feature matrix of the sample speech data to a first model, the sample speech feature matrix being used for representing time-domain and frequency-domain features of the sample speech data.

The first model is a speech recognition model that is not completely trained, or referred to as an initial speech recognition model, whose structure is the same as that of the speech recognition model.

In some embodiments, the server extracts a time-domain sample speech feature vector and frequency-domain sample speech feature vector of the sample speech data. The server concatenates the time-domain sample speech feature vector dimensionally with the frequency-domain sample speech feature vector, and performs feature extraction on a concatenated sample speech feature vector to obtain the sample speech feature matrix. In some embodiments, feature extraction refers to performing a convolution operation on the concatenated sample speech feature vector.

In this implementation mode, the server simultaneously extracts a time-domain feature and frequency-domain feature of the sample speech data. The time-domain feature and the frequency-domain feature represent a feature of the speech data from two spaces, namely representing the feature of the speech data from a time-domain space and a frequency-domain space. Therefore, the sample speech feature matrix may represent the sample speech data more accurately, and the speech recognition accuracy may be improved.

For example, the server frames the sample speech data to obtain multiple sample speech frames. The server performs time-domain feature extraction on the multiple sample speech frames to obtain time-domain sample speech feature vectors of the sample speech data, the time-domain sample speech feature vector being used for representing at least one of short-term energy and short-term zero-crossing rate of the speech frame. The server windows the multiple sample speech frames, and performs Fourier transform on the multiple windowed sample speech frames to obtain frequency-domain sample speech data corresponding to the sample speech data. The server performs frequency-domain feature extraction on the frequency-domain sample speech data to obtain the frequency-domain sample speech feature vector of the sample speech data, the frequency-domain sample speech feature vector being used for representing at least one of a formant feature, pitch frequency, and harmonic frequency of the frequency-domain sample speech data. The server concatenates the time-domain sample speech feature vector dimensionally with the frequency-domain sample speech feature vector to obtain a two-dimensional sample speech feature vector. The server performs a convolution operation on the two-dimensional sample speech feature vector to obtain the sample speech feature matrix, and inputs the sample speech feature matrix to the first model. Each one-dimensional vector in the sample speech feature matrix represents time-domain and frequency-domain features of a speech frame.

For ease of understanding the above-mentioned implementation mode more clearly, descriptions will now be made with a specific example.

The sample speech data acquired by the server is $$\begin{bmatrix} 15 & 30 & 45 & 60 & 75 & 90 \\ 0.11 & 0.12 & 0.14 & 0.15 & 0.15 & 0.13 \end{bmatrix}.$$

If a frame shift is 30 ms, the server frames the sample speech data $$\begin{bmatrix} 15 & 30 & 45 & 60 & 75 & 90 \\ 0.11 & 0.12 & 0.14 & 0.15 & 0.15 & 0.13 \end{bmatrix}$$

to obtain three sample speech frames $$\begin{bmatrix} 15 & 30 \\ 0.11 & 0.12 \end{bmatrix}, \begin{bmatrix} 45 & 60 \\ 0.14 & 0.15 \end{bmatrix}, \text{ and } \begin{bmatrix} 75 & 90 \\ 0.15 & 0.13 \end{bmatrix}.$$

The server performs time-domain feature extraction on the three sample speech frames to obtain time-domain speech feature vectors (1, 3), (1, 2), and (2, 3) of the three sample speech frames. The server concatenates in length the time-domain speech feature vectors of the three sample speech frames to obtain a time-domain sample speech feature vector (1, 3, 1, 2, 2, 3). The server performs a windowing process on the three sample speech frames $$\begin{bmatrix} 15 & 30 \\ 0.11 & 0.12 \end{bmatrix}, \begin{bmatrix} 45 & 60 \\ 0.14 & 0.15 \end{bmatrix}, \text{ and } \begin{bmatrix} 75 & 90 \\ 0.15 & 0.13 \end{bmatrix}.$$

A type of a window function for the windowing process is a Hanning window or Hamming window, and no limits are made thereto. After windowing the three sample speech frames, the server performs Fourier transform on the three windowed sample speech frames to obtain frequency-domain sample speech data corresponding to the sample speech data, such as $$\begin{bmatrix} 25 & 30 & 26 & 28 & 23 & 35 \\ 20 & 30 & 20 & 35 & 40 & 30 \end{bmatrix},$$

where the digit in the first row represents frequency, and the digit in the second row represents amplitude. The server performs frequency-domain feature extraction on the frequency-domain sample speech data $$\begin{bmatrix} 25 & 30 & 26 & 28 & 23 & 35 \\ 20 & 30 & 20 & 35 & 40 & 30 \end{bmatrix}$$

to obtain a frequency-domain sample speech feature vector, such as (2, 1, 3, 3, 1, 3). The server concatenates the time-domain sample speech feature vector (1, 3, 1, 2, 2, 3) dimensionally with the frequency-domain sample speech feature vector (2, 1, 3, 3, 1, 3) to obtain $$\begin{bmatrix} 1 & 3 & 1 & 2 & 2 & 3 \\ 2 & 1 & 3 & 3 & 1 & 3 \end{bmatrix}.$$

The server performs a convolution operation on $$\begin{bmatrix} 1 & 3 & 1 & 2 & 2 & 3 \\ 2 & 1 & 3 & 3 & 1 & 3 \end{bmatrix},$$

for a purpose of performing positional encoding on $$\begin{bmatrix} 1 & 3 & 1 & 2 & 2 & 3 \\ 2 & 1 & 3 & 3 & 1 & 3 \end{bmatrix}.$$

Positional encoding refers to encoding the sample speech frames according to their sequence of appearance to obtain a sample speech feature matrix, to match the speech recognition process of the first model. If the sample speech feature matrix is $$\begin{bmatrix} 2 & 1 & 2 \\ 1 & 3 & 1 \\ 3 & 2 & 4 \end{bmatrix},$$

the vector (2, 1, 2) in the first row represents the feature of the first sample speech frame, the vector (1, 3, 1) in the second row represents the feature of the second sample speech frame, and the vector (3, 2, 4) in the third row represents the feature of the third sample speech frame. The server inputs the sample speech feature matrix $$\begin{bmatrix} 2 & 1 & 2 \\ 1 & 3 & 1 \\ 3 & 2 & 4 \end{bmatrix}$$

to the first model.

In some embodiments, after extracting the time-domain sample speech feature vector and frequency-domain sample speech feature vector of the sample speech data, the server may further concatenate the time-domain sample speech feature vector and the frequency-domain sample speech feature vector for input to the first model, and then an input unit 401 of the first model performs a convolution operation on a concatenated sample speech feature vector to obtain the sample speech feature matrix. Manners for feature extraction and the convolution operation refer to the descriptions in the previous implementation mode, and will not be elaborated herein.

In 803, the server performs attention encoding on the sample speech feature matrix through the first model to obtain an encoded sample matrix, the encoded sample matrix including multiple encoded sample vectors.

In some embodiments, the server performs linear transformation on the sample speech feature matrix based on three linear transformation matrices through the first model to obtain a sample query matrix, a sample key matrix, and a sample value matrix. The server acquires a first sample product of the sample query matrix and a transpose of the sample key matrix, and normalizes the first sample product to obtain a first sample reference matrix. The server obtains an encoded sample matrix according to the first sample reference matrix and the sample value matrix.

For example, the server may perform right multiplication on the sample speech feature matrix $$\begin{bmatrix} 2 & 1 & 2 \\ 1 & 3 & 1 \\ 3 & 2 & 4 \end{bmatrix}$$

with three linear transformation matrices $$WQ\begin{bmatrix} 1 & 2 & 1 \\ 2 & 1 & 2 \\ 1 & 1 & 2 \end{bmatrix}, WK\begin{bmatrix} 2 & 2 & 1 \\ 1 & 1 & 2 \\ 1 & 2 & 1 \end{bmatrix}, \text{ and } WV\begin{bmatrix} 1 & 1 & 1 \\ 1 & 2 & 1 \\ 2 & 2 & 1 \end{bmatrix}$$

respectively through the first model to obtain a sample query matrix $$Q_s = \begin{bmatrix} 6 & 7 & 8 \\ 8 & 6 & 9 \\ 11 & 12 & 15 \end{bmatrix},$$

a sample key matrix $$K_s\begin{bmatrix} 7 & 9 & 6 \\ 6 & 7 & 8 \\ 12 & 16 & 11 \end{bmatrix},$$

and a sample value matrix $$V_s\begin{bmatrix} 7 & 8 & 5 \\ 6 & 9 & 5 \\ 13 & 15 & 9 \end{bmatrix}.$$

The server acquires a first sample product $$\begin{bmatrix} 153 & 149 & 272 \\ 164 & 162 & 291 \\ 275 & 270 & 489 \end{bmatrix}$$

of the sample query matrix $$\begin{bmatrix} 6 & 7 & 8 \\ 8 & 6 & 9 \\ 11 & 12 & 15 \end{bmatrix}$$

and a transpose $$\begin{bmatrix} 7 & 6 & 12 \\ 9 & 7 & 16 \\ 6 & 8 & 11 \end{bmatrix}$$

of the sample key matrix $$\begin{bmatrix} 7 & 9 & 6 \\ 6 & 7 & 8 \\ 12 & 16 & 11 \end{bmatrix}$$

through the first model. The server normalizes the first sample product by use of the softmax function through the first model to obtain a first sample reference matrix $$\begin{bmatrix} 0.27 & 0.26 & 0.47 \\ 0.27 & 0.26 & 0.47 \\ 0.27 & 0.26 & 0.47 \end{bmatrix}.$$

The server obtains an encoded sample matrix according to the first sample reference matrix $$\begin{bmatrix} 0.27 & 0.26 & 0.47 \\ 0.27 & 0.26 & 0.47 \\ 0.27 & 0.26 & 0.47 \end{bmatrix}$$

and the sample value matrix $$V_s \begin{bmatrix} 7 & 8 & 5 \\ 6 & 9 & 5 \\ 13 & 15 & 9 \end{bmatrix}.$$

A method the server obtains the encoded sample matrix according to the first sample reference matrix and the sample value matrix through the first model will now be described.

In some embodiments, the server performs dropout and residual accumulation on a product of the first sample reference matrix and the sample value matrix through the first model to obtain a second sample reference matrix. The server normalizes the second sample reference matrix through the first model to obtain a third sample reference matrix. The server obtains the encoded sample matrix according to the third sample reference matrix through the first model.

For example, the server multiplies the first sample reference matrix $$\begin{bmatrix} 0.27 & 0.26 & 0.47 \\ 0.27 & 0.26 & 0.47 \\ 0.27 & 0.26 & 0.47 \end{bmatrix}$$

and the sample value matrix $$V_s \begin{bmatrix} 7 & 8 & 5 \\ 6 & 9 & 5 \\ 13 & 15 & 9 \end{bmatrix}$$

through the first model to obtain a single-head sample attention matrix $$\begin{bmatrix} 9.56 & 11.55 & 6.88 \\ 9.56 & 11.55 & 6.88 \\ 9.56 & 11.55 & 6.88 \end{bmatrix}.$$

The calculation process refers to formula (1).

$$\text{Attention}(Q_s, K_s, V_s) = \text{Softmax}\left(\frac{Q_s K_s^T}{\sqrt{d_k}}\right) V_s \tag{1}$$

where $Q_S$, $K_S$, and $V_S$ represent the sample query matrix, the sample key matrix, and the sample value matrix, Attention( ) represents attention encoding, Softmax( ) represents a normalization function, and $d_k$ is a constant. For more clarity of description, it is assumed that $d_k=1$ in the following description.

The server performs a dropout process on the single-head sample attention matrix $$\begin{bmatrix} 9.56 & 11.55 & 6.88 \\ 9.56 & 11.55 & 6.88 \\ 9.56 & 11.55 & 6.88 \end{bmatrix}$$

through the first model to obtain, for example, a matrix $$\begin{bmatrix} 9.56 & 11.55 & 6.88 \\ 9.56 & 0 & 6.88 \\ 9.56 & 11.55 & 6.88 \end{bmatrix}.$$

The server performs residual accumulation on the matrix $$\begin{bmatrix} 9.56 & 11.55 & 6.88 \\ 9.56 & 0 & 6.88 \\ 9.56 & 11.55 & 6.88 \end{bmatrix}$$

through the first model to obtain a second sample reference matrix $$\begin{bmatrix} 11.56 & 12.55 & 9.88 \\ 10.56 & 3 & 7.88 \\ 12.56 & 13.55 & 10.88 \end{bmatrix}.$$

The process of residual accumulation is a process of adding the matrix $$\begin{bmatrix} 9.56 & 11.55 & 6.88 \\ 9.56 & 0 & 6.88 \\ 9.56 & 11.55 & 6.88 \end{bmatrix}$$

and the sample speech feature matrix $$\begin{bmatrix} 2 & 1 & 2 \\ 1 & 3 & 1 \\ 3 & 2 & 4 \end{bmatrix}.$$

The server performs normalization (Norm) on the second sample reference matrix $$\begin{bmatrix} 11.56 & 12.55 & 9.88 \\ 10.56 & 3 & 7.88 \\ 12.56 & 13.55 & 10.88 \end{bmatrix}$$

through the first model to obtain a third sample reference matrix, such as $$\begin{bmatrix} 3 & 4 & 1 \\ 2 & -5 & 2 \\ 4 & 5 & 5 \end{bmatrix}.$$

Normalization refers to subtracting an average value of all the digits in the matrix from each digit in the matrix and then dividing a difference by a variance of each digit, so as to adjust a distribution of the digits in the matrix. The server obtains the encoded sample matrix according to the third sample reference matrix through the first model.

A method the server obtains the encoded sample matrix according to the third sample reference matrix through the first model will now be described.

In some embodiments, the server performs first full connection and linear rectification on the third sample reference matrix through the first model to obtain a fourth sample reference matrix. The server performs second full connection, dropout, residual accumulation, and normalization on the fourth sample reference matrix through the first model to obtain the encoded sample matrix.

For example, the server multiplies the third sample reference matrix $$\begin{bmatrix} 3 & 4 & 1 \\ 2 & -5 & 2 \\ 4 & 5 & 5 \end{bmatrix}$$

and a first full connection matrix $$FC1 \begin{bmatrix} 0.4 & 0.6 & 0.5 \\ 0.3 & 0.7 & 0.8 \\ 0.6 & 0.5 & 0.5 \end{bmatrix}$$

through the first model to obtain a matrix $$\begin{bmatrix} 3 & 5.1 & 5.2 \\ 0.5 & -1.3 & -2 \\ 6.1 & 8.4 & 8.5 \end{bmatrix},$$

the first full connection matrix $$FC1 \begin{bmatrix} 0.4 & 0.6 & 0.5 \\ 0.3 & 0.7 & 0.8 \\ 0.6 & 0.5 & 0.5 \end{bmatrix}$$

being a weight matrix for first full connection. The server performs Relu-based linear rectification on the matrix $$\begin{bmatrix} 3 & 5.1 & 5.2 \\ 0.5 & -1.3 & -2 \\ 6.1 & 8.4 & 8.5 \end{bmatrix}$$

through the first model to obtain a fourth sample reference matrix $$\begin{bmatrix} 3 & 5.1 & 5.2 \\ 0.5 & 0 & 0 \\ 6.1 & 8.4 & 8.5 \end{bmatrix}.$$

Here, linear rectification is nonnegative processing, namely negative numbers in the matrix are set to 0. The server multiplies the fourth sample reference matrix $$\begin{bmatrix} 3 & 5.1 & 5.2 \\ 0.5 & 0 & 0 \\ 6.1 & 8.4 & 8.5 \end{bmatrix}$$

and a second full connection matrix $$FC2 \begin{bmatrix} 0.5 & 0.8 & 0.3 \\ 0.4 & 0.6 & 0.9 \\ 0.2 & 0.3 & 0.6 \end{bmatrix}$$

through the first model to obtain a matrix $$\begin{bmatrix} 4.58 & 7.02 & 8.61 \\ 0.25 & 0.4 & 0.15 \\ 8.11 & 12.47 & 14.49 \end{bmatrix},$$

the second full connection matrix $$FC2 \begin{bmatrix} 0.5 & 0.8 & 0.3 \\ 0.4 & 0.6 & 0.9 \\ 0.2 & 0.3 & 0.6 \end{bmatrix}$$

being a weight matrix for second full connection. The server performs dropout on the matrix $$\begin{bmatrix} 4.58 & 7.02 & 8.61 \\ 0.25 & 0.4 & 0.15 \\ 8.11 & 12.47 & 14.49 \end{bmatrix}$$

through the first model to obtain a matrix $$\begin{bmatrix} 4.58 & 7.02 & 0 \\ 0.25 & 0.4 & 0.15 \\ 8.11 & 0 & 0 \end{bmatrix}.$$

Dropout refers to randomly setting the numerical value in the matrix to 0, so as to avoid over-fitting. The server performs residual accumulation on the matrix $$\begin{bmatrix} 4.58 & 7.02 & 0 \\ 0.25 & 0.4 & 0.15 \\ 8.11 & 0 & 0 \end{bmatrix}$$

through the first model to obtain a matrix $$\begin{bmatrix} 7.58 & 11.02 & 1 \\ 2.25 & -4.6 & 2.15 \\ 12.11 & 5 & 5 \end{bmatrix}$$

The process of residual accumulation is a process of adding the matrix $$\begin{bmatrix} 4.58 & 7.02 & 0 \\ 0.25 & 0.4 & 0.15 \\ 8.11 & 0 & 0 \end{bmatrix}$$

and the third sample reference matrix $$\begin{bmatrix} 3 & 4 & 1 \\ 2 & -5 & 2 \\ 4 & 5 & 5 \end{bmatrix}.$$

The server normalizes the matrix $$\begin{bmatrix} 7.58 & 11.02 & 1 \\ 2.25 & -4.6 & 2.15 \\ 12.11 & 5 & 5 \end{bmatrix}$$

through the first model to obtain the encoded sample matrix, such as $$\begin{bmatrix} 1 & -4 & 2 \\ 2 & 2 & 3 \\ 3 & 6 & 5 \end{bmatrix},$$

where vectors $(1, -4, 2)$, $(2, 2, 3)$, and $(3, 6, 5)$ are encoded sample vectors.

It is be noted that after obtaining the encoded sample matrix, the server may further add a starting vector corresponding to a starting symbol <s>, such as $(0, 0, 0)$, to the head of the encoded sample matrix, and add an ending vector corresponding to an ending symbol </s>, such as $(1, 1, 1)$, to the end of the encoded sample matrix, to finally obtain an encoded sample matrix $$\begin{bmatrix} 0 & 0 & 0 \\ 1 & -4 & 2 \\ 2 & 2 & 3 \\ 3 & 6 & 5 \\ 1 & 1 & 1 \end{bmatrix}.$$

In 804, the server decodes the multiple encoded sample vectors in the encoded sample matrix through the first model according to positions of the multiple encoded sample vectors in the encoded sample matrix to output a predicted character string corresponding to the sample speech data, a decoding sequence of the multiple encoded sample vectors being related to the positions of the multiple encoded sample vectors in the encoded sample matrix.

In a decoding process, the server decodes one encoded sample vector in the encoded sample matrix each time. Taking the encoded sample matrix $$\begin{bmatrix} 0 & 0 & 0 \\ 1 & -4 & 2 \\ 2 & 2 & 3 \\ 3 & 6 & 5 \\ 1 & 1 & 1 \end{bmatrix}$$

as an example, the server decodes a first encoded sample vector $(0, 0, 0)$ in the encoded sample matrix $$\begin{bmatrix} 0 & 0 & 0 \\ 1 & -4 & 2 \\ 2 & 2 & 3 \\ 3 & 6 & 5 \\ 1 & 1 & 1 \end{bmatrix}$$

through the first model in a first decoding process, decodes a second encoded sample vector $(1, -4, 2)$ through the first model in a second decoding process, and so on.

In some embodiments, in a decoding process, the server fuses the first encoded sample vector in the multiple encoded sample vectors and a predicted character vector through the first model to obtain a first fused sample vector, the first encoded sample vector being an encoded vector associated with the decoding sequence, and the predicted character vector being an embedded vector of a character obtained in a last decoding process. The server obtains, through the first model, a first implicit sample feature vector corresponding to the first fused sample vector according to the first fused sample vector, an implicit sample feature vector obtained in the last decoding process, and a sample state reference vector, the sample state reference vector being associated with a historical first fused sample vector in a historical decoding process. The server obtains a predicted character corresponding to the first encoded sample vector through the first model according to the first implicit sample feature vector and the first fused sample vector. The server combines, based on completion of decoding of the multiple encoded sample vectors, predicted characters corresponding to the multiple encoded sample vectors to output a predicted character string corresponding to the sample speech data.

For more clarity of describing the above-mentioned implementation mode, descriptions will now be made with several parts.

1: A method the server fuses the first encoded sample vector and the predicted character vector to obtain the first fused vector will be described first.

In some embodiments, the server performs attention encoding on the first encoded sample vector through the first model. An attention encoding method belongs to the same inventive concept as the method provided in formula (1), but $Q_s$, $K_s$, and $V_s$ in formula (1) have different meanings. In the process of performing attention encoding on the first encoded sample vector, $Q_s$ represents an implicit sample feature vector obtained in the last decoding process, and $K_s$ and $V_s$ are both the first encoded sample vector. The server adds a vector obtained by performing attention encoding on the first encoded sample vector and the predicted character vector to obtain the first fused sample vector.

For example, if the first encoded sample vector is $(1, -4, 2)$, the implicit sample feature vector obtained in the last decoding process is $(1, 0.25, 0.5)$, and the predicted character vector is $(1, 1, 1)$, the server multiplies the implicit sample feature vector $(1, 0.25, 0.5)$ and a transpose $(1, -4, 2)^T$ of the first encoded sample vector $(1, -4, 2)$, namely $Q_s \times K_s^T$, to obtain 1. The server multiplies 1 and the first encoded sample vector $(1, -4, 2)$ to obtain a vector $(1, -4, 2)$. The server adds the vector $(1, -4, 2)$ and the predicted character vector $(1, 1, 1)$ to obtain a first fused sample vector $(2, -3, 3)$.

2: A method the server obtains the first implicit sample feature vector corresponding to the first fused sample vector according to the first fused sample vector, the implicit sample feature vector obtained in the last decoding process, and the sample state reference vector will then be described.

In some embodiments, the server updates the sample state reference vector according to the first fused sample vector and the implicit sample feature vector obtained in the last decoding process. The server fuses, through the first model, an updated sample state reference vector, the first fused sample vector, and the implicit sample feature vector obtained in the last decoding process to obtain the first implicit sample feature vector corresponding to the first fused sample vector.

For example, the server may update the sample state reference vector based on formulas (2) to (5).

$$f(t) = \sigma(W(f)x(t) + U(f)h(t-1)) \quad (2)$$

$$i(t) = \sigma(W(i)x(t)h(t-1)) \quad (3)$$

$$c°(t) = \tanh(W(c)x(t) + U(c)h(t-1)) \quad (4)$$

$$c(t) = f(y) \otimes c(t-1) + i(t) \otimes c°(t) \quad (5)$$

where $f(t)$, $i(t)$, and $c°(t)$ represent intermediate parameters, $x(t)$ represents the first fused sample vector, $h(t-1)$ represents the implicit sample feature vector obtained in the last decoding process, $\sigma(\ )$ represents a Sigmoid activation function, tanh represents the tangent activation function, $W(f)$, $U(f)$, $W(i)$, $W(c)$, and $U(c)$ represent model parameters, $c(t)$ represents an updated state reference vector, and $c(t-1)$ represents the sample state reference vector before updating.

After obtaining the updated sample state reference vector $c(t)$, the server fuses, based on formulas (6) and (7), the updated sample state reference vector, the first fused sample vector, and the implicit sample feature vector obtained in the last decoding process to obtain the first implicit sample feature vector corresponding to the first fused sample vector.

$$O(t) = \sigma(W(o)x(t) + U(o)h(t-1)) \quad (6)$$

$$h(t) = O(t) \otimes \tanh(c(t)) \quad (7)$$

where $O(t)$ and $W(o)$ represent intermediate parameters, and $h(t)$ represents the first implicit sample feature vector.

3: A method the server obtains the predicted character corresponding to the first encoded sample vector according to the first implicit sample feature vector and the first fused sample vector will now be described.

In some embodiments, the server fuses the first implicit sample feature vector and the first fused sample vector through the first model to obtain a second fused sample vector. The server normalizes the second fused sample vector through the first model to obtain probabilities of multiple characters corresponding to the first encoded sample vector. The server outputs the predicted character corresponding to the highest probability in the multiple characters through the first model, the predicted character corresponding to the highest probability being the predicted character corresponding to the first encoded sample vector.

A method the server obtains the second fused sample vector will be described first.

In some embodiments, the server acquires a second sample product of the first implicit sample feature vector and a transpose of the first fused sample vector through the first model. The server normalizes the second sample product through the first model to obtain a first sample reference vector. The server obtains the second fused sample vector through the first model according to the first sample reference vector, the first implicit sample feature vector, and the first fused sample vector.

For example, the server acquires a second sample product of the first implicit sample feature vector and a transpose of the first fused sample vector through the first model. The server normalizes the second sample product through the first model to obtain a first sample reference vector. The server concatenates a product of the first sample reference vector and the first fused sample vector dimensionally with the first implicit sample feature vector through the first model to obtain a second sample reference vector. The server performs full connection and linear rectification on the second sample reference vector through the first model to obtain the second fused sample vector.

A method the server outputs the predicted character corresponding to the highest probability in the multiple predicted characters will now be described.

For example, if the second fused sample vector is $(1, 2, 1.5)$, the server performs full connection on the second fused sample vector $(1, 2, 1.5)$ through the first model to obtain a vector $(2, 3, 5)$. The server normalizes the vector $(2, 3, 5)$ through the first model, namely processing the vector $(2, 3, 5)$ through the softmax function, to obtain a vector $(0.2, 0.3, 0.5)$, where $0.2$, $0.3$, and $0.5$ correspond probabilities of different characters respectively. The server may determines the character corresponding to $0.5$ as the predicted character corresponding to the first encoded sample vector.

In 805, the server determines difference information between the predicted character string and an actual character string corresponding to the sample speech data.

In some embodiments, the server constructs a loss function shown in formula (8) to determine difference information between the predicted character string and an actual character string corresponding to the sample speech data.

$$\text{Loss}_{CE} = (P, R) \quad (8)$$

where $\text{Loss}_{CE}$ represents a cross-entropy loss function, i.e., the difference information between the predicted character string and the actual character string corresponding to the sample speech data, P represents an embedded vector corresponding to the predicted character string, and R represents an embedded vector corresponding to the actual character string.

After operation 805, the server performs operation 806 in a case that the difference information does not satisfy a target condition. That the difference information does not satisfy the target condition may refer to that a similarity between P and R is less than a similarity threshold. The server performs operation 807 in a case that the difference information satisfies the target condition.

In 806, the server adjusts a model parameter of the first model according to the difference information in a case that the difference information between the predicted character string and the actual character string corresponding to the sample speech data does not satisfy a target condition.

In some embodiments, the server may adjust a model parameter of the first model according to the difference information by use of a gradient descent method or a back propagation algorithm. The gradient descent method may be stochastic gradient descent (SGD), batch gradient descent, mini-batch gradient descent, etc. No limits are made thereto.

In 807, the server determines the first model as a trained speech recognition model in a case that the difference information between the predicted character string and the actual character string corresponding to the sample speech data satisfies the target condition.

Through the above operations 801 to 807, a speech recognition model may be trained for speech recognition. Compared with the hybrid speech recognition system in the related art, the speech recognition model in the disclosure is simpler in architecture and lower in construction efficiency.

Figure 9:
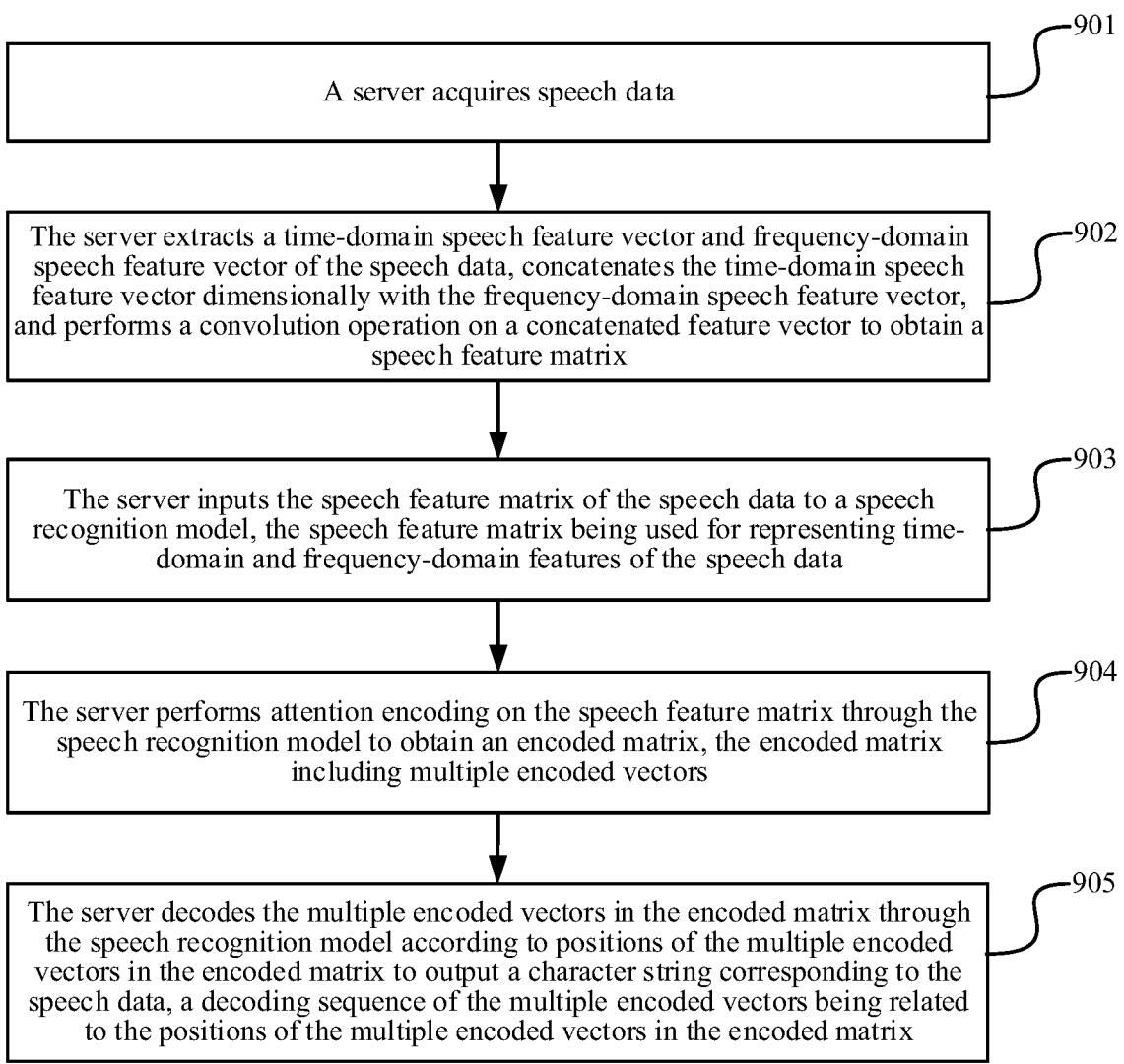
FIG. 9 is a flowchart of a speech recognition method according to some embodiments.

The training method for the speech recognition model is introduced through the above operations 801 to 807, and the speech recognition method provided in some embodiments will now be described based on the speech recognition model trained by 801 to 807. Referring to FIG. 9, the method includes the following operations.

In 901, a server acquires speech data.

In some embodiments, a terminal transmits compressed speech data to a server, and after acquiring the compressed speech data, the server decompresses the compressed speech data to obtain speech data.

Taking instant messaging as an example, when user A wants to transmit a speech message to a second terminal 120 of user B through a first terminal 110, user A records a speech through the first terminal 110 to obtain speech data. The first terminal 110 compresses recorded speech data, and transmits the compressed speech data and an identifier of user B to a server. The server transmits the compressed speech data to the second terminal 120 according to the identifier of user B. An account of user B has logged on to the second terminal 120. If it is inconvenient for user B to listen to the speech message of user A, user B triggers a speech to text function provided by the second terminal 120. The second terminal 120 transmits the compressed speech data to the server. The server decompresses the compressed speech data to obtain speech data, and then may perform speech recognition based on the speech data to obtain a character string corresponding to the speech data.

Taking an online game as an example, if a player wants to communicate with another player in the game, but the game situation is relatively tense, the player may record a speech through a terminal. The terminal compresses recorded speech data, and transmits the compressed speech data to a server. The server decompresses the compressed speech data to obtain the speech data, and then may perform speech recognition based on the speech data to obtain a character string corresponding to the speech data.

In 902, the server extracts a time-domain speech feature vector and frequency-domain speech feature vector of the speech data, concatenates the time-domain speech feature vector dimensionally with the frequency-domain speech feature vector, and performs a convolution operation on a concatenated feature vector to obtain a speech feature matrix.

In 903, the server inputs the speech feature matrix of the speech data to a speech recognition model, the speech feature matrix being used for representing time-domain and frequency-domain features of the speech data.

Operation 903 belongs to the same inventive concept as operation 802, and an implementation process refers to the descriptions about operation 802, and will not be elaborated herein.

In 904, the server performs attention encoding on the speech feature matrix through the speech recognition model to obtain an encoded matrix, the encoded matrix including multiple encoded vectors.

In some embodiments, the server performs linear transformation on the speech feature matrix based on three linear transformation matrices through the speech recognition model to obtain a query matrix, a key matrix, and a value matrix. The server acquires a first product of the query matrix and a transpose of the key matrix through the speech recognition model. The server normalizes the first product through the speech recognition model to obtain a first reference matrix. The server obtains an encoded matrix through the speech recognition model according to the first reference matrix and the value matrix.

The operation that the server obtains an encoded matrix through the speech recognition model according to the first reference matrix and the value matrix includes the following operations.

The server performs dropout and residual accumulation on a product of the first reference matrix and the value matrix through the speech recognition model to obtain a second reference matrix. The server normalizes the second reference matrix through the speech recognition model to obtain a third reference matrix. The server obtains the encoded matrix through the speech recognition model according to the third reference matrix.

The operation that the server obtains the encoded matrix through the speech recognition model according to the third reference matrix includes the following operations.

The server performs first full connection and linear rectification on the third reference matrix through the speech recognition model to obtain a fourth reference matrix. The server performs second full connection, dropout, residual accumulation, and normalization on the fourth reference matrix through the speech recognition model to obtain the encoded matrix.

Operation 904 belongs to the same inventive concept as operation 803, and an implementation process of each operation refers to the descriptions about operation 803, and will not be elaborated herein.

In 905, the server decodes multiple encoded vectors in the encoded matrix through the speech recognition model according to positions of the multiple encoded vectors in the encoded matrix to output a character string corresponding to the speech data, a decoding sequence of the multiple encoded vectors being related to the positions of the multiple encoded vectors in the encoded matrix.

In a decoding process, the server fuses the first encoded vector in the multiple encoded vectors and a character vector through the speech recognition model to obtain a first fused vector, the first encoded vector being an encoded vector associated with the decoding sequence, and the character vector being an embedded vector of a character obtained in a last decoding process. The server obtains a first implicit feature vector corresponding to the first fused vector according to the first fused vector, an implicit feature vector obtained in the last decoding process, and a state reference vector, the state reference vector being associated with a historical first fused vector in a historical decoding process. The server obtains a character corresponding to the first encoded vector through the speech recognition model according to the first implicit feature vector and the first fused vector. The server combines, based on completion of decoding of the multiple encoded vectors, characters corresponding to the multiple encoded vectors to output a character string corresponding to the speech data.

In some embodiments, the operation that the server obtains a first implicit feature vector corresponding to the first fused vector according to the first fused vector, an implicit feature vector obtained in the last decoding process, and a state reference vector includes the following operations.

The server updates a state reference vector according to the first fused vector and the implicit feature vector obtained in the last decoding process. The server fuses an updated state reference vector, the first fused vector, and the implicit feature vector obtained in the last decoding process to obtain the first implicit feature vector corresponding to the first fused vector. The server fuses the first implicit feature vector and the first fused vector through the speech recognition model to obtain a second fused vector. The server normalizes the second fused vector to obtain probabilities of multiple characters corresponding to the first encoded vector. The server outputs the character corresponding to the highest probability in the multiple characters through the speech recognition model, the character corresponding to the highest probability being the character corresponding to the first encoded vector.

In some embodiments, the operation that the server fuses the first implicit feature vector and the first fused vector to obtain a second fused vector includes the following operations.

The server acquires a second product of the first implicit feature vector and a transpose of the first fused vector through the speech recognition model. The server normalizes the second product through the speech recognition model to obtain a first reference vector. The server obtains the second fused vector through the speech recognition model according to the first reference vector, the first implicit feature vector, and the first fused vector.

In some embodiments, the operation that the server obtains the second fused vector through the speech recognition model according to the first reference vector, the first implicit feature vector, and the first fused vector includes the following operations.

The server concatenates a product of the first reference vector and the first fused vector dimensionally with the first implicit feature vector through the speech recognition model to obtain a second reference vector. Full connection and linear rectification are performed on the second reference vector to obtain the second fused vector.

Operation 905 belongs to the same inventive concept as operation 804, and an implementation process of each operation refers to the descriptions about operation 804, and will not be elaborated herein.

It is be noted that operations 901 to 905 are described taking an execution body being the server as an example. In another possible implementation mode, operations 901 to 905 may be performed by a terminal as the execution body. No limits are made thereto.

Referring to Table 1, the speech recognition system using the speech recognition method provided in some embodiments is better than each speech recognition system in the related art in speech real-time factor and speech recognition accuracy.

TABLE 1

| | Hybrid system | | End-to-end system | | |
| System | | | LSTM- | Transformer- | TL-AED (the |
| Model | LSTM | Transformer | AED | AED | disclosure) |
|---|---|---|---|---|---|
| Real-time factor | ★★★★ | ★★★★★ | ★★★★ | ★★★★☆ | ★★★★★ |
| Recognition rate | ★★★☆ | ★★★★ | ★★★☆ | ★★★★☆ | ★★★★★ |

The technical solution provided in some embodiments is based on a TL-AED model, end-to-end speech recognition may be implemented, the shortcomings of speech recognition in the related art are improved well, and speech recognition service with a high recognition rate and a good real-time factor is provided. Under the same machine, 100 threads are enabled for each model to make tests by combining an average real-time factor and an average word error rate. A word error rate represents the number of wrong errors in 100 words, and the average word error rate represents average performance of the solution in multiple clean and noisy test sets.

According to comparison results in Table 2, experimental result analysis shows that the technical solution (TL-AED model) provided in some embodiments, as an end-to-end speech recognition system, not only supports rapid construction of a speech recognition system, but also is lower than any other solution in word error rate. In addition, this solution is close to the best transformer-hybrid in real-time factor. Therefore, the technical solution provided in some embodiments is good in real-time factor of the output, efficient, and accurate.

TABLE 2

| | Hybrid system | | End-to-end system | | |
| System | | | LSTM- | Transformer- | TL-AED (the |
| Model | LSTM | Transformer | AED | AED | disclosure) |
|---|---|---|---|---|---|
| Average real-time factor | 0.55 | 0.4 | 0.89 | 0.52 | 0.44 |
| Average word error rate | 14.4 | 11.3 | 12.5 | 10.6 | 10.2 |

Through the technical solution provided in some embodiments, attention encoding and sequential decoding are used for speech recognition. Attention encoding is performed on the speech feature matrix, so that effective utilization of parallel computation of a GPU may be implemented. The encoded vector is decoded according to the position of the encoded vector in the encoded matrix, so that the number of parameters may be reduced. In addition, prediction is performed by use of a memory feature of the speech recognition model according to sequentially related encoded vectors, so that the speech recognition accuracy is improved.

Figure 10:
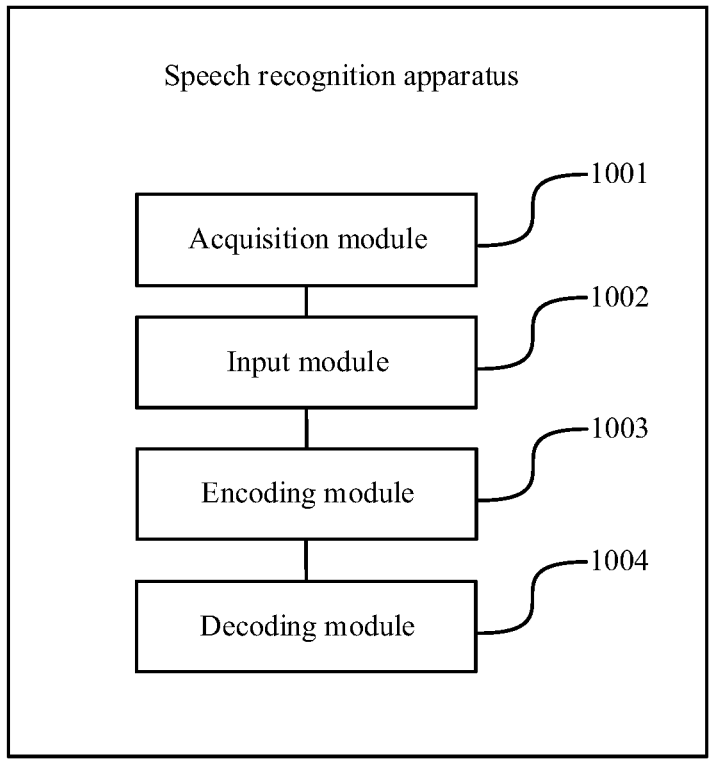
FIG. 10 is a schematic structural diagram of a speech recognition apparatus according to some embodiments.

FIG. 10 is a schematic structural diagram of a speech recognition apparatus according to some embodiments. Referring to FIG. 10, the apparatus includes an acquisition module 1001, an input module 1002, and an output module 1003.

The acquisition module 1001 is configured to acquire speech data.

The input module 1002 is configured to input a speech feature matrix of the speech data to a speech recognition model, the speech feature matrix being used for representing time-domain and frequency-domain features of the speech data.

The output module 1003 is configured to perform attention encoding on the speech feature matrix through the speech recognition model to obtain an encoded matrix, and decode multiple encoded vectors in the encoded matrix according to positions of the multiple encoded vectors in the encoded matrix to output a character string corresponding to the speech data, a decoding sequence of the multiple encoded vectors being related to the positions of the multiple encoded vectors in the encoded matrix.

In some embodiments, the output module may be configured to perform linear transformation on the speech feature matrix based on three linear transformation matrices to obtain a query matrix, a key matrix, and a value matrix; acquire a first product of the query matrix and a transpose of the key matrix; normalize the first product to obtain a first reference matrix; and obtain the encoded matrix according to the first reference matrix and the value matrix.

In some embodiments, the output module may be configured to perform dropout and residual accumulation on a product of the first reference matrix and the value matrix to obtain a second reference matrix; normalize the second reference matrix to obtain a third reference matrix; and obtain the encoded matrix according to the third reference matrix.

In some embodiments, the output module may be configured to perform first full connection and linear rectification on the third reference matrix to obtain a fourth reference matrix; and perform second full connection, dropout, residual accumulation, and normalization on the fourth reference matrix to obtain the encoded matrix.

In some embodiments, the output module may be configured to fuse, in a decoding process, the first encoded vector in the multiple encoded vectors and a character vector to obtain a first fused vector, the first encoded vector being an encoded vector associated with the decoding sequence, and the character vector being an embedded vector of a character obtained in a last decoding process; obtain a first implicit feature vector corresponding to the first fused vector according to the first fused vector, an implicit feature vector obtained in the last decoding process, and a state reference vector, the state reference vector being associated with a historical first fused vector in a historical decoding process; obtain a character corresponding to the first encoded vector according to the first implicit feature vector and the first fused vector; and combine, based on completion of decoding of the multiple encoded vectors, characters corresponding to the multiple encoded vectors to output a character string corresponding to the speech data.

In some embodiments, the output module may be configured to update a state reference vector according to the first fused vector and the implicit feature vector obtained in the last decoding process; and fuse an updated state reference vector, the first fused vector, and the implicit feature vector obtained in the last decoding process to obtain the first implicit feature vector corresponding to the first fused vector.

In some embodiments, the output module may be configured to fuse the first implicit feature vector and the first fused vector to obtain a second fused vector; normalize the second fused vector to obtain probabilities of multiple characters corresponding to the first encoded vector; and output the character corresponding to the highest probability in the multiple characters, the character corresponding to the highest probability being the character corresponding to the first encoded vector.

In some embodiments, the output module may be configured to acquire a second product of the first implicit feature vector and a transpose of the first fused vector; normalize the second product to obtain a first reference vector; and obtain the second fused vector according to the first reference vector, the first implicit feature vector, and the first fused vector.

In some embodiments, the output module may be configured to concatenate a product of the first reference vector and the first fused vector dimensionally with the first implicit feature vector to obtain a second reference vector; and perform full connection and linear rectification on the second reference vector to obtain the second fused vector.

In some embodiments, the apparatus may further include a feature extraction module, configured to extract a time-domain speech feature vector and frequency-domain speech feature vector of the speech data, concatenate the time-domain speech feature vector dimensionally with the frequency-domain speech feature vector, and perform a convolution operation on a concatenated feature vector to obtain the speech feature matrix.

In some embodiments, a speech recognition model training apparatus includes:

a sample data acquisition module, configured to acquire sample speech data;

a sample feature input module, configured to input a sample speech feature matrix of the sample speech data to a first model, the sample speech feature matrix being used for representing time-domain and frequency-domain features of the sample speech data;

a sample output module, configured to perform attention encoding on the sample speech feature matrix through the first model to obtain an encoded sample matrix, and decode multiple encoded sample vectors in the encoded sample matrix according to positions of the multiple encoded sample vectors in the encoded sample matrix to output a predicted character string corresponding to the sample speech data, a decoding sequence of the multiple encoded sample vectors being related to the positions of the multiple encoded sample vectors in the encoded sample matrix; and a training module, configured to determine the first model as a trained speech recognition model in a case that difference information between the predicted character string and an actual character string corresponding to the sample speech data satisfies a target condition.

In some embodiments, the sample output module may be configured to perform linear transformation on the sample speech feature matrix based on three linear transformation matrices to obtain a sample query matrix, a sample key matrix, and a sample value matrix; acquire a first sample product of the sample query matrix and a transpose of the sample key matrix; normalize the first sample product to obtain a first sample reference matrix; and obtain the encoded sample matrix according to the first sample reference matrix and the sample value matrix.

In some embodiments, the sample output module may be configured to perform dropout and residual accumulation on a product of the first sample reference matrix and the sample value matrix to obtain a second sample reference matrix; normalize the second sample reference matrix to obtain a third sample reference matrix; and obtain the encoded sample matrix according to the third sample reference matrix.

In some embodiments, the sample output module may be configured to perform first full connection and linear rectification on the third sample reference matrix to obtain a fourth sample reference matrix; and perform second full connection, dropout, residual accumulation, and normalization on the fourth sample reference matrix to obtain the encoded sample matrix.

In some embodiments, the sample output module may be configured to fuse, in a decoding process, the first encoded sample vector in the multiple encoded sample vectors and a predicted character vector to obtain a first fused sample vector, the first encoded sample vector being an encoded sample vector associated with the decoding sequence, and the predicted character vector being an embedded vector of a predicted character obtained in a last decoding process; obtain a first implicit sample feature vector corresponding to the first fused sample vector according to the first fused sample vector, an implicit sample feature vector obtained in the last decoding process, and a sample state reference vector, the sample state reference vector being associated with a historical first fused sample vector in a historical decoding process; obtain a predicted character corresponding to the first encoded sample vector according to the first implicit sample feature vector and the first fused sample vector; and combine, based on completion of decoding of the multiple encoded sample vectors, predicted characters corresponding to the multiple encoded sample vectors to output the predicted character string corresponding to the sample speech data.

In some embodiments, the sample output module may be configured to update the sample state reference vector according to the first fused sample vector and the implicit sample feature vector obtained in the last decoding process; and fuse an updated sample state reference vector, the first fused sample vector, and the implicit sample feature vector obtained in the last decoding process to obtain the first implicit sample feature vector corresponding to the first fused sample vector.

In some embodiments, the sample output module may be configured to fuse the first implicit sample feature vector and the first fused sample vector to obtain a second fused sample vector; normalize the second fused sample vector to obtain probabilities of multiple predicted characters corresponding to the first encoded sample vector; and output the predicted character corresponding to the highest probability in the multiple predicted characters, the predicted character corresponding to the highest probability being the predicted character corresponding to the first encoded sample vector.

In some embodiments, the sample output module may be configured to acquire a second sample product of the first implicit sample feature vector and a transpose of the first fused sample vector; normalize the second sample product to obtain a first sample reference vector; and obtain the second fused sample vector according to the first sample reference vector, the first implicit sample feature vector, and the first fused sample vector.

In some embodiments, the sample output module may be configured to concatenate a product of the first sample reference vector and the first fused sample vector dimensionally with the first implicit sample feature vector to obtain a second sample reference vector; and perform full connection and linear rectification on the second sample reference vector to obtain the second fused sample vector.

In some embodiments, the apparatus may further include a sample feature extraction module, configured to extract a time-domain sample speech feature vector and frequency-domain sample speech feature vector of the sample speech data, concatenate the time-domain sample speech feature vector dimensionally with the frequency-domain sample speech feature vector, and perform a convolution operation on a concatenated sample feature vector to obtain the sample speech feature matrix.

Through the technical solution provided in some embodiments, attention encoding and sequential decoding are used for speech recognition. Attention encoding is performed on the speech feature matrix, so that effective utilization of parallel computation of a GPU may be implemented. The encoded vector is decoded according to the position of the encoded vector in the encoded matrix, so that the number of parameters may be reduced. In addition, prediction is performed by use of a memory feature of the speech recognition model according to sequentially related encoded vectors, so that the speech recognition accuracy is improved.

Some embodiments provide a computer device, including one or more processors and one or more memories. The one or more memories store at least one program code, and the program code is loaded and executed by the one or more processors to perform the following operations:

acquiring speech data;

inputting a speech feature matrix of the speech data to a speech recognition model, the speech feature matrix being used for representing time-domain and frequency-domain features of the speech data;

performing attention encoding on the speech feature matrix through the speech recognition model to obtain an encoded matrix, the encoded matrix including multiple encoded vectors; and decoding the multiple encoded vectors in the encoded matrix according to positions of the multiple encoded vectors in the encoded matrix to output a character string corresponding to the speech data, a decoding sequence of the multiple encoded vectors being related to the positions of the multiple encoded vectors in the encoded matrix.

In some embodiments, the processor is configured to perform the following operations:

performing linear transformation on the speech feature matrix based on three linear transformation matrices to obtain a query matrix, a key matrix, and a value matrix;

acquiring a first product of the query matrix and a transpose of the key matrix;

normalizing the first product to obtain a first reference matrix; and obtaining the encoded matrix according to the first reference matrix and the value matrix.

In some embodiments, the processor is configured to perform the following operations:

performing dropout and residual accumulation on a product of the first reference matrix and the value matrix to obtain a second reference matrix;

normalizing the second reference matrix to obtain a third reference matrix; and obtaining the encoded matrix according to the third reference matrix.

In some embodiments, the processor is configured to perform the following operations:

performing first full connection and linear rectification on the third reference matrix to obtain a fourth reference matrix; and performing second full connection, dropout, residual accumulation, and normalization on the fourth reference matrix to obtain the encoded matrix.

In some embodiments, the processor is configured to perform the following operations:

fusing, in a decoding process, the first encoded vector in the multiple encoded vectors and a character vector to obtain a first fused vector, the first encoded vector being an encoded vector associated with the decoding sequence, and the character vector being an embedded vector of a character obtained in a last decoding process;

obtaining a first implicit feature vector corresponding to the first fused vector according to the first fused vector, an implicit feature vector obtained in the last decoding process, and a state reference vector, the state reference vector being associated with a historical first fused vector in a historical decoding process;

obtaining a character corresponding to the first encoded vector according to the first implicit feature vector and the first fused vector; and combining, based on completion of decoding of the multiple encoded vectors, characters corresponding to the multiple encoded vectors to output a character string corresponding to the speech data.

In some embodiments, the processor is configured to perform the following operations:

updating a state reference vector according to the first fused vector and the implicit feature vector obtained in the last decoding process; and fusing an updated state reference vector, the first fused vector, and the implicit feature vector obtained in the last decoding process to obtain the first implicit feature vector corresponding to the first fused vector.

In some embodiments, the processor is configured to perform the following operations:

fusing the first implicit feature vector and the first fused vector to obtain a second fused vector;

normalizing the second fused vector to obtain probabilities of multiple characters corresponding to the first encoded vector; and outputting the character corresponding to the highest probability in the multiple characters, the character corresponding to the highest probability being the character corresponding to the first encoded vector.

In some embodiments, the processor is configured to perform the following operations:

acquiring a second product of the first implicit feature vector and a transpose of the first fused vector;

normalizing the second product to obtain a first reference vector; and obtaining the second fused vector according to the first reference vector, the first implicit feature vector, and the first fused vector.

In some embodiments, the processor is configured to perform the following operations:

concatenating a product of the first reference vector and the first fused vector dimensionally with the first implicit feature vector to obtain a second reference vector; and performing full connection and linear rectification on the second reference vector to obtain the second fused vector.

In some embodiments, the processor is configured to perform the following operations:

extracting a time-domain speech feature vector and frequency-domain speech feature vector of the speech data;

concatenating the time-domain speech feature vector dimensionally with the frequency-domain speech feature vector, and performing a convolution operation on a concatenated feature vector to obtain the speech feature matrix.

In some embodiments, the processor is configured to perform the following operations:

acquiring sample speech data;

inputting a sample speech feature matrix of the sample speech data to a first model, the sample speech feature matrix being used for representing time-domain and frequency-domain features of the sample speech data;

performing attention encoding on the sample speech feature matrix through the first model to obtain an encoded sample matrix; decoding multiple encoded sample vectors in the encoded sample matrix according to positions of the multiple encoded sample vectors in the encoded sample matrix to output a predicted character string corresponding to the sample speech data, a decoding sequence of the multiple encoded sample vectors being related to the positions of the multiple encoded sample vectors in the encoded sample matrix; and determining the first model as a trained speech recognition model in a case that difference information between the predicted character string and an actual character string corresponding to the sample speech data satisfies a target condition.

In some embodiments, the processor is configured to perform the following operations:

performing linear transformation on the sample speech feature matrix based on three linear transformation matrices to obtain a sample query matrix, a sample key matrix, and a sample value matrix;

acquiring a first sample product of the sample query matrix and a transpose of the sample key matrix;

normalizing the first sample product to obtain a first sample reference matrix; and obtaining the encoded sample matrix according to the first sample reference matrix and the sample value matrix.

In some embodiments, the processor is configured to perform the following operations:

performing dropout and residual accumulation on a product of the first sample reference matrix and the sample value matrix to obtain a second sample reference matrix;

normalizing the second sample reference matrix to obtain a third sample reference matrix; and obtaining the encoded sample matrix according to the third sample reference matrix.

In some embodiments, the processor is configured to perform the following operations:

performing first full connection and linear rectification on the third sample reference matrix to obtain a fourth sample reference matrix; and performing second full connection, dropout, residual accumulation, and normalization on the fourth sample reference matrix to obtain the encoded sample matrix.

In some embodiments, the processor is configured to perform the following operations:

fusing, in a decoding process, the first encoded sample vector in the multiple encoded sample vectors and a predicted character vector to obtain a first fused sample vector, the first encoded sample vector being an encoded sample vector associated with the decoding sequence, and the predicted character vector being an embedded vector of a predicted character obtained in a last decoding process;

obtaining a first implicit sample feature vector corresponding to the first fused sample vector according to the first fused sample vector, an implicit sample feature vector obtained in the last decoding process, and a sample state reference vector, the sample state reference vector being associated with a historical first fused sample vector in a historical decoding process;

obtaining a predicted character corresponding to the first encoded sample vector according to the first implicit sample feature vector and the first fused sample vector; and combining, based on completion of decoding of the multiple encoded sample vectors, predicted characters corresponding to the multiple encoded sample vectors to output the predicted character string corresponding to the sample speech data.

In some embodiments, the processor is configured to perform the following operations:

updating the sample state reference vector according to the first fused sample vector and the implicit sample feature vector obtained in the last decoding process; and fusing an updated sample state reference vector, the first fused sample vector, and the implicit sample feature vector obtained in the last decoding process to obtain the first implicit sample feature vector corresponding to the first fused sample vector.

In some embodiments, the processor is configured to perform the following operations:

fusing the first implicit sample feature vector and the first fused sample vector to obtain a second fused sample vector;

normalizing the second fused sample vector to obtain probabilities of multiple predicted characters corresponding to the first encoded sample vector; and outputting the predicted character corresponding to the highest probability in the multiple predicted characters, the predicted character corresponding to the highest probability being the predicted character corresponding to the first encoded sample vector.

In some embodiments, the processor is configured to perform the following operations:

acquiring a second sample product of the first implicit sample feature vector and a transpose of the first fused sample vector;

normalizing the second sample product to obtain a first sample reference vector; and obtaining the second fused sample vector according to the first sample reference vector, the first implicit sample feature vector, and the first fused sample vector.

In some embodiments, the processor is configured to perform the following operations:

concatenating a product of the first sample reference vector and the first fused sample vector dimensionally with the first implicit sample feature vector to obtain a second sample reference vector; and performing full connection and linear rectification on the second sample reference vector to obtain the second fused sample vector.

In some embodiments, the processor is configured to perform the following operations:

extracting a time-domain sample speech feature vector and frequency-domain sample speech feature vector of the sample speech data;

concatenating the time-domain sample speech feature vector dimensionally with the frequency-domain sample speech feature vector; and performing a convolution operation on a concatenated sample feature vector to obtain the sample speech feature matrix.

In some embodiments, the computer device may be implemented as a terminal or server. The structure of the terminal will now be introduced first.

Figure 11:
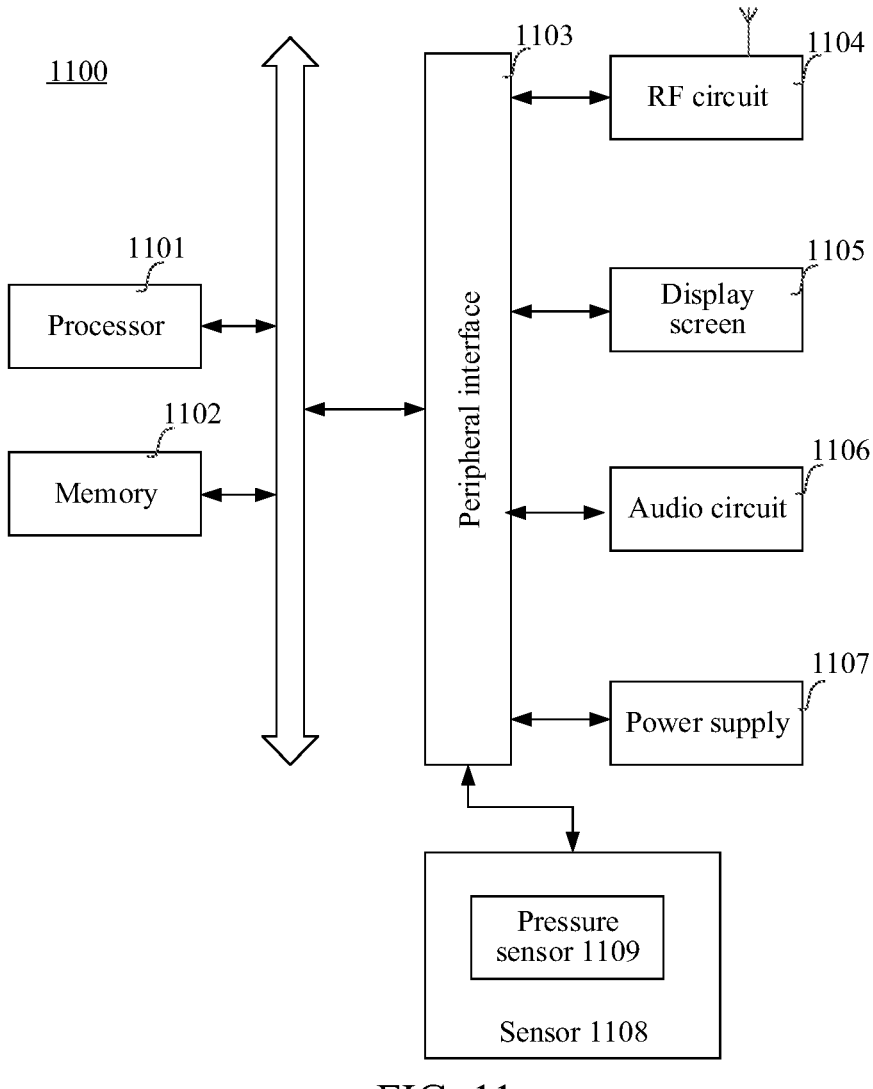
FIG. 11 is a schematic structural diagram of a terminal according to some embodiments.

FIG. 11 is a schematic structural diagram of a terminal according to some embodiments. The terminal 1100 may be a smartphone, a tablet computer, a notebook computer, or a desktop computer. The terminal 1100 may also be referred to as another name such as user equipment, a portable terminal, a laptop terminal, or a desktop terminal.

Generally, the terminal 1100 includes one or more processors 1101 and one or more memories 1102.

The processor 1101 may include one or more processing cores, such as, a 4-core processor or an 8-core processor. In some embodiments, the processor 1101 may further include an AI processor. The AI processor is configured to process a calculation operation related to machine learning.

The memory 1102 may include one or more computer-readable storage media that may be non-transitory. The memory 1102 may further include a high-speed random access memory (RAM), and a non-volatile memory such as one or more magnetic disk storage devices or flash storage devices.

In some embodiments, the terminal 1100 further includes: a peripheral interface 1103 and at least one peripheral device. The processor 1101, the memory 1102, and the peripheral interface 1103 may be connected through a bus or a signal cable. Each peripheral device may be connected to the peripheral interface 1103 through a bus, a signal cable, or a circuit board. Specifically, the peripheral device includes: at least one of a radio frequency (RF) circuit 1104, a display screen 1105, an audio circuit 1106, and a power supply 1107.

The peripheral interface 1103 may be configured to connect at least one peripheral device related to input/output (I/O) to the processor 1101 and the memory 1102. In some embodiments, the processor 1101, the memory 1102, and the peripheral interface 1103 are integrated on the same chip or the same circuit board. In some other embodiments, any or both of the processor 1101, the memory 1102, and the peripheral interface 1103 may be implemented on an independent chip or circuit board. This is not limited in this embodiment.

The RF circuit 1104 is configured to receive and transmit an RF signal, which is also referred to as an electromagnetic signal. The RF circuit 1104 communicates with a communication network and other communication devices through the electromagnetic signal.

The display screen 1105 is configured to display a user interface (UI). The UI may include a graphic, text, an icon, a video, and any combination thereof. When the display screen 1105 is a touch display screen, the display screen 1105 also has a capability to collect a touch signal on or above a surface of the display screen 1105. The touch signal may be input, as a control signal, to the processor 1101 for processing. In this case, the display screen 1105 may be further configured to provide a virtual control and/or a virtual keyboard that are/is also referred to as a soft control and/or a soft keyboard.

The audio circuit 1106 may include a microphone and a speaker. The microphone is configured to collect sound waves of users and surroundings, and convert the sound waves into electrical signals and input the signals to the processor 1101 for processing, or input the signals to the RF circuit 1104 to implement speech communication.

The power supply 1107 is configured to supply power to components in the terminal 1100. The power supply 1107 may be an alternating current, a direct current, a primary battery, or a rechargeable battery.

In some embodiments, the terminal 1100 further includes one or more sensors 1108. The one or more sensors 1108 include but are not limited to a pressure sensor 1109.

The pressure sensor 1109 may be disposed on a side frame of the terminal 1100 and/or a lower layer of the display screen 1105. When the pressure sensor 1109 is disposed at the side frame of the terminal 1100, a holding signal of the user on the terminal 1100 may be detected, and the processor 1101 performs left/right hand recognition or a quick operation according to the holding signal collected by the pressure sensor 1109. When the pressure sensor 1109 is disposed on the low layer of the display screen 1105, the processor 1101 controls, according to a pressure operation of the user on the display screen 1105, an operable control on the UI interface.

A person skilled in the art may understand that the structure shown in FIG. 11 constitutes no limitation on the terminal 1100, and the terminal may include more or fewer components than those shown in the figure, or some components may be combined, or a different component deployment may be used.

The computer device may also be implemented as a server. The structure of the serer will now be introduced.

Figure 12:
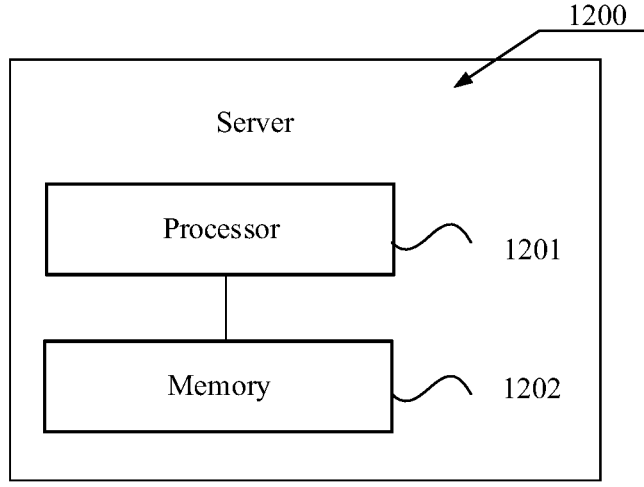
FIG. 12 is a schematic structural diagram of a server according to some embodiments.

FIG. 12 is a schematic structural diagram of a server according to some embodiments. The server 1200 may vary greatly because a configuration or performance varies, and may include one or more central processing units (CPU) 1201 and one or more memories 1202. The one or more memories 1202 store at least one program code, and the at least one program code is loaded and executed by the one or more processors 1201 to implement the methods provided in the foregoing various method embodiments. Certainly, the server 1200 may further include a wired or wireless network interface, a keyboard, an input/output interface and other components to facilitate input/output. The server 1200 may further include other components for implementing device functions. Details are not described herein again.

In some embodiments, a computer-readable storage medium, such as, a memory including a program code is further provided. The foregoing program code may be executed by a processor to implement the methods in the foregoing various embodiments. For example, the computer-readable storage medium may be a read-only memory (ROM), a random access memory (RAM), a compact disc ROM (CD-ROM), a magnetic tape, a floppy disk, an optical data storage device, or the like.

In some embodiments, a computer program product or a computer program is further provided. The computer program product or the computer program includes a computer program code, and the computer program code is stored in a computer-readable storage medium. A processor of a computer device reads the computer program code from the computer-readable storage medium, and executes the computer program code, causing the computer device to perform the methods in the foregoing various embodiments.

A person of ordinary skill in the art may understand that all or some of the operations of the foregoing embodiments may be implemented by hardware, or may be implemented by a program instructing related hardware. The program may be stored in a computer-readable storage medium. The storage medium may be: a ROM, a magnetic disk, an optical disc, or the like.

The foregoing descriptions are merely some embodiments of present disclosure, but are not intended to limit the disclosure. Any modification, equivalent replacement, or improvement made without departing from the spirit and principle of the disclosure shall fall within the protection scope of the disclosure.

What is claimed is:

1. A speech recognition method, performed by a computer device, the speech recognition method comprising:
acquiring speech data comprising a plurality of frames;
inputting a speech feature matrix of the speech data to a speech recognition model, the speech feature matrix being used for representing time-domain and frequency-domain features of the speech data, wherein each row of the speech feature matrix corresponds to a frame of speech from the plurality of frames;
performing attention encoding on the speech feature matrix through the speech recognition model to obtain an encoded matrix, the encoded matrix comprising multiple encoded vectors arranged along each row of the encoded matrix; and
decoding the multiple encoded vectors in the encoded matrix according to row positions of the multiple encoded vectors in the encoded matrix to output a character string corresponding to the speech data, a decoding sequence of the multiple encoded vectors being related to the positions of the multiple encoded vectors in the encoded matrix, the decoding including:
fusing, in a decoding process, a first encoded vector in the multiple encoded vectors and a character vector to obtain a first fused vector, the first encoded vector being an encoded vector associated with the decoding sequence, and the character vector being an embedded vector of a character obtained in a last decoding process, the first encoded vector fused with the character vector by adding a predicted character vector to a multiplication of the character vector with a transpose of the first encoded vector to obtain the first fused vector in which the first fused vector, the first encoded vector, and the character vector have a same length.

2. The speech recognition method according to claim 1, wherein the performing comprises:
performing linear transformation on the speech feature matrix based on three linear transformation matrices to obtain a query matrix, a key matrix, and a value matrix;
acquiring a first product of the query matrix and a transpose of the key matrix;
normalizing the first product to obtain a first reference matrix; and
obtaining the encoded matrix according to the first reference matrix and the value matrix.

3. The speech recognition method according to claim 2, wherein the obtaining the encoded matrix according to the first reference matrix and the value matrix comprises:
performing dropout and residual accumulation on a product of the first reference matrix and the value matrix to obtain a second reference matrix;
normalizing the second reference matrix to obtain a third reference matrix; and
obtaining the encoded matrix according to the third reference matrix.

4. The speech recognition method according to claim 3, wherein the obtaining the encoded matrix according to the third reference matrix comprises:

performing first full connection and linear rectification on the third reference matrix to obtain a fourth reference matrix; and performing second full connection, dropout, residual accumulation, and normalization on the fourth reference matrix to obtain the encoded matrix.

5. The speech recognition method according to claim 1, wherein the decoding comprises:

obtaining a first implicit feature vector corresponding to the first fused vector according to the first fused vector, an implicit feature vector obtained in the last decoding process, and a state reference vector, the state reference vector being associated with a historical first fused vector in a historical decoding process;

obtaining a character corresponding to the first encoded vector according to the first implicit feature vector and the first fused vector; and combining, based on completion of decoding of the multiple encoded vectors, characters corresponding to the multiple encoded vectors to output the character string corresponding to the speech data.

6. The speech recognition method according to claim 5, wherein the obtaining a first implicit feature vector corresponding to the first fused vector according to the first fused vector, an implicit feature vector obtained in the last decoding process, and a state reference vector comprises:

updating the state reference vector according to the first fused vector and the implicit feature vector obtained in the last decoding process; and fusing an updated state reference vector, the first fused vector, and the implicit feature vector obtained in the last decoding process to obtain the first implicit feature vector corresponding to the first fused vector.

7. The speech recognition method according to claim 5, wherein the obtaining a character corresponding to the first encoded vector according to the first implicit feature vector and the first fused vector comprises:

fusing the first implicit feature vector and the first fused vector to obtain a second fused vector;

normalizing the second fused vector to obtain probabilities of multiple characters corresponding to the first encoded vector; and outputting the character corresponding to the highest probability in the multiple characters, the character corresponding to the highest probability being the character corresponding to the first encoded vector.

8. The speech recognition method according to claim 7, wherein the fusing the first implicit feature vector and the first fused vector comprises:

acquiring a second product of the first implicit feature vector and a transpose of the first fused vector;

normalizing the second product to obtain a first reference vector; and obtaining the second fused vector according to the first reference vector, the first implicit feature vector, and the first fused vector.

9. The speech recognition method according to claim 8, wherein the obtaining the second fused vector according to the first reference vector, the first implicit feature vector, and the first fused vector comprises:

concatenating a product of the first reference vector and the first fused vector dimensionally with the first implicit feature vector to obtain a second reference vector; and performing full connection and linear rectification on the second reference vector to obtain the second fused vector.

10. The speech recognition method according to claim 1, before the inputting a speech feature matrix of the speech data to a speech recognition model, further comprising:

extracting a time-domain speech feature vector and frequency-domain speech feature vector of the speech data;

concatenating the time-domain speech feature vector dimensionally with the frequency-domain speech feature vector; and performing a convolution operation on a concatenated feature vector to obtain the speech feature matrix.

11. The speech recognition method according to claim 1, further comprising:

acquiring sample speech data;

inputting a sample speech feature matrix of the sample speech data to a first model, the sample speech feature matrix being used for representing time-domain and frequency-domain features of the sample speech data;

performing attention encoding on the sample speech feature matrix through the first model to obtain an encoded sample matrix; decoding multiple encoded sample vectors in the encoded sample matrix according to positions of the multiple encoded sample vectors in the encoded sample matrix to output a predicted character string corresponding to the sample speech data, a decoding sequence of the multiple encoded sample vectors being related to the positions of the multiple encoded sample vectors in the encoded sample matrix; and determining the first model as a trained speech recognition model in a case that difference information between the predicted character string and an actual character string corresponding to the sample speech data satisfies a target condition.

12. The speech recognition method according to claim 11, wherein the performing attention encoding on the sample speech feature matrix comprises:

performing linear transformation on the sample speech feature matrix based on three linear transformation matrices to obtain a sample query matrix, a sample key matrix, and a sample value matrix;

acquiring a first sample product of the sample query matrix and a transpose of the sample key matrix;

normalizing the first sample product to obtain a first sample reference matrix; and obtaining the encoded sample matrix according to the first sample reference matrix and the sample value matrix.

13. The speech recognition method according to claim 12, wherein the obtaining the encoded sample matrix according to the first sample reference matrix and the sample value matrix comprises:

performing dropout and residual accumulation on a product of the first sample reference matrix and the sample value matrix to obtain a second sample reference matrix;

normalizing the second sample reference matrix to obtain a third sample reference matrix; and obtaining the encoded sample matrix according to the third sample reference matrix.

14. The speech recognition method according to claim 13, wherein the obtaining the encoded sample matrix according to the third sample reference matrix comprises:

performing first full connection and linear rectification on the third sample reference matrix to obtain a fourth sample reference matrix; and performing second full connection, dropout, residual accumulation, and normalization on the fourth sample reference matrix to obtain the encoded sample matrix.

15. The speech recognition method according to claim 11, wherein the decoding multiple encoded sample vectors in the encoded sample matrix according to positions of the multiple encoded sample vectors in the encoded sample matrix to output a predicted character string corresponding to the sample speech data comprises:

fusing, in a decoding process, the first encoded sample vector in the multiple encoded sample vectors and a predicted character vector to obtain a first fused sample vector, the first encoded sample vector being an encoded sample vector associated with the decoding sequence, and the predicted character vector being an embedded vector of a predicted character obtained in a last decoding process;

obtaining a first implicit sample feature vector corresponding to the first fused sample vector according to the first fused sample vector, an implicit sample feature vector obtained in the last decoding process, and a sample state reference vector, the sample state reference vector being associated with a historical first fused sample vector in a historical decoding process;

obtaining a predicted character corresponding to the first encoded sample vector according to the first implicit sample feature vector and the first fused sample vector; and combining, based on completion of decoding of the multiple encoded sample vectors, predicted characters corresponding to the multiple encoded sample vectors to output the predicted character string corresponding to the sample speech data.

16. The speech recognition method according to claim 15, wherein the obtaining a first implicit sample feature vector, an implicit sample feature vector obtained in the last decoding process, and a sample state reference vector comprises:

updating the sample state reference vector according to the first fused sample vector and the implicit sample feature vector obtained in the last decoding process; and fusing an updated sample state reference vector, the first fused sample vector, and the implicit sample feature vector obtained in the last decoding process to obtain the first implicit sample feature vector corresponding to the first fused sample vector.

17. The speech recognition method according to claim 15, wherein the obtaining a predicted character corresponding to the first encoded sample vector according to the first implicit sample feature vector and the first fused sample vector comprises:

fusing the first implicit sample feature vector and the first fused sample vector to obtain a second fused sample vector;

normalizing the second fused sample vector to obtain probabilities of multiple predicted characters corresponding to the first encoded sample vector; and outputting the predicted character corresponding to the highest probability in the multiple predicted characters, the predicted character corresponding to the highest probability being the predicted character corresponding to the first encoded sample vector.

18. The speech recognition method according to claim 17, wherein the fusing the first implicit sample feature vector and the first fused sample vector to obtain a second fused sample vector comprises:

acquiring a second sample product of the first implicit sample feature vector and a transpose of the first fused sample vector;

normalizing the second sample product to obtain a first sample reference vector; and obtaining the second fused sample vector according to the first sample reference vector, the first implicit sample feature vector, and the first fused sample vector.

19. A speech recognition apparatus comprising:

at least one memory configured to store program code; and at least one processor configured to read the program code and operate as instructed by the program code, the program code comprising:

acquisition code configured to cause at least one of the at least one processor to acquire speech data comprising a plurality of frames;

input code configured to cause at least one of the at least one processor to input a speech feature matrix of the speech data to a speech recognition model, the speech feature matrix being used for representing time-domain and frequency-domain features of the speech data, wherein each row of the speech feature matrix corresponds to a frame of speech from the plurality of frames;

output code configured to cause at least one of the at least one processor to perform attention encoding on the speech feature matrix through the speech recognition model to obtain an encoded matrix, the encoded matrix comprising multiple encoded vectors arranged along each row of the encoded matrix; and decode code configured to cause at least one of the at least one processor to decode multiple encoded vectors in the encoded matrix according to row positions of the multiple encoded vectors in the encoded matrix to output a character string corresponding to the speech data, a decoding sequence of the multiple encoded vectors being related to the positions of the multiple encoded vectors in the encoded matrix, the decode code further configured to cause the at least one processor to:

fuse, in a decoding process, a first encoded vector in the multiple encoded vectors and a character vector to obtain a first fused vector, the first encoded vector being an encoded vector associated with the decoding sequence, and the character vector being an embedded vector of a character obtained in a last decoding process, the first encoded vector fused with the character vector by adding a predicted character vector to a multiplication of the character vector with a transpose of the first encoded vector to obtain the first fused vector in which the first fused vector, the first encoded vector, and the character vector have a same length.

20. A non-transitory computer-readable storage medium, storing computer code that when executed by at least one processor causes the at least one processor to at least:

acquire speech data comprising a plurality of frames;

input a speech feature matrix of the speech data to a speech recognition model, the speech feature matrix being used for representing time-domain and frequency-domain features of the speech data, wherein each row of the speech feature matrix corresponds to a frame of speech from the plurality of frames;

perform attention encoding on the speech feature matrix through the speech recognition model to obtain an encoded matrix, the encoded matrix comprising multiple encoded vectors arranged along each row of the encoded matrix; and decode the multiple encoded vectors in the encoded matrix according to positions of the multiple encoded vectors in the encoded matrix to output a character string corresponding to the speech data, a decoding sequence of the multiple encoded vectors being related to the positions of the multiple encoded vectors in the encoded matrix, the decoding including:

fusing, in a decoding process, a first encoded vector in the multiple encoded vectors and a character vector to obtain a first fused vector, the first encoded vector being an encoded vector associated with the decoding sequence, and the character vector being an embedded vector of a character obtained in a last decoding process, the first encoded vector fused with the character vector by adding a predicted character vector to a multiplication of the character vector with a transpose of the first encoded vector to obtain the first fused vector in which the first fused vector, the first encoded vector, and the character vector have a same length.

\* \* \* \* \*